(12) United States Patent
Yang et al.

(10) Patent No.: US 12,069,663 B2
(45) Date of Patent: Aug. 20, 2024

(54) BOUNDARY IDENTIFICATION FOR PROBABILISTIC AMPLITUDE SHAPING

(71) Applicant: QUALCOMM Incorporated, San Diego, CA (US)

(72) Inventors: Lin Yang, San Diego, CA (US); Bin Tian, San Diego, CA (US); Dung Ngoc Doan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/816,370

(22) Filed: Jul. 29, 2022

(65) Prior Publication Data
US 2022/0377727 A1 Nov. 24, 2022

Related U.S. Application Data

(62) Division of application No. 17/099,343, filed on Nov. 16, 2020, now Pat. No. 11,438,880.
(Continued)

(51) Int. Cl.
*H04W 72/20* (2023.01)
*H04J 11/00* (2006.01)
(Continued)

(52) U.S. Cl.
CPC ............. *H04W 72/20* (2023.01); *H04J 11/00* (2013.01); *H04W 72/046* (2013.01)

(58) Field of Classification Search
CPC ....... H04L 27/156; H04L 7/007; H04L 25/49; H04L 25/4919
See application file for complete search history.

(56) References Cited

U.S. PATENT DOCUMENTS

| 6,891,905 B1 * | 5/2005 | Malone | H04L 7/007 375/334 |
| 6,993,084 B1 * | 1/2006 | Eberlein | H04L 27/2656 375/260 |

(Continued)

FOREIGN PATENT DOCUMENTS

| CN | 101686218 A | 3/2010 |
| CN | 110199490 A | 9/2019 |

(Continued)

OTHER PUBLICATIONS

International Search Report and Written Opinion—PCT/US2020/060905—ISA/EPO—dated Aug. 31, 2020.
(Continued)

*Primary Examiner* — Yee F Lam
(74) *Attorney, Agent, or Firm* — Kevin M. Donnelly; Holland & Hart LLP

(57) ABSTRACT

This disclosure provides methods, devices and systems for amplitude shaping encoding, and specifically, for indicating boundaries in bitstreams encoded using amplitude shaping encoding. In some aspects, a transmitting device may insert, into an bitstream to indicate a boundary, a sequence of amplitude bits not associated with any patterns of bit values in a lookup table used for the encoding. In some other aspects, a transmitting device may monitor a length of the amplitude bits in a bitstream during the encoding and stop the encoding on information bits at an end of a current data unit responsive to the length reaching a threshold. In some other aspects, a transmitting device may monitor the length of the information bits and, for each data unit, determine whether a boundary is or would be reached. Responsive to determining that a boundary is or would be reached, the transmitting device may not include, before the boundary, any amplitude bits generated based on the information bits
(Continued)

in the data unit, and instead add padding bits after a last amplitude bit before the boundary.

14 Claims, 21 Drawing Sheets

Related U.S. Application Data

(60) Provisional application No. 62/939,254, filed on Nov. 22, 2019.

(51) Int. Cl.
*H04W 72/04* (2023.01)
*H04W 72/044* (2023.01)

(56) References Cited

U.S. PATENT DOCUMENTS

| | | | |
|---|---|---|---|
| 9,876,614 | B1 | 1/2018 | Sun et al. |
| 10,069,519 | B1 | 9/2018 | Millar et al. |
| 10,200,231 | B1 | 2/2019 | Lefevre et al. |
| 10,516,503 | B1 | 12/2019 | Millar et al. |
| 10,700,912 | B2 | 6/2020 | Herath et al. |
| 10,938,617 | B2 | 3/2021 | Chen |
| 11,012,187 | B1* | 5/2021 | Kim .................. H04L 1/0047 |
| 11,570,780 | B2 | 1/2023 | Yang et al. |
| 2003/0232612 | A1* | 12/2003 | Richards ............ H04B 1/71637 455/323 |
| 2011/0102208 | A1* | 5/2011 | Terashima .......... H04L 25/4919 341/67 |
| 2011/0158348 | A1* | 6/2011 | Ponnampalam .... H04L 27/2627 375/295 |
| 2013/0100988 | A1 | 4/2013 | Miyoshi et al. |
| 2015/0198700 | A1 | 7/2015 | Morita et al. |
| 2016/0286011 | A1 | 9/2016 | Kasher et al. |
| 2017/0134043 | A1 | 5/2017 | Lee et al. |
| 2018/0077685 | A1 | 3/2018 | Wu et al. |
| 2018/0197573 | A1* | 7/2018 | Harada .............. G11B 20/1833 |
| 2019/0052511 | A1 | 2/2019 | Gultekin et al. |
| 2019/0173586 | A1* | 6/2019 | Cevrero ............ H04B 10/524 |
| 2019/0334755 | A1 | 10/2019 | Limberg |
| 2020/0084072 | A1* | 3/2020 | Masuda ................ H03M 5/145 |
| 2020/0092057 | A1 | 3/2020 | Herath et al. |
| 2021/0160843 | A1 | 5/2021 | Yang et al. |

FOREIGN PATENT DOCUMENTS

| | | |
|---|---|---|
| TW | 201246997 A | 11/2012 |
| WO | 2021055411 | 3/2021 |

OTHER PUBLICATIONS

European Search Report—EP23195915—Search Authority—Munich—Dec. 14, 2023.
Taiwan Search Report—TW109140458—TIPO—Mar. 8, 2024.

* cited by examiner

BOUNDARY IDENTIFICATION FOR PROBABILISTIC AMPLITUDE SHAPING

PRIORITY INFORMATION

The present Application for Patent is a Division of U.S. patent application Ser. No. 17/099,343 by Yang et al., filed 16 Nov. 2020 and entitled "BOUNDARY IDENTIFICATION FOR PROBABILISTIC AMPLITUDE SHAPING," now U.S. Pat. No. 11,438,880, issued 6 Sep. 2022, which claims priority under 35 U.S.C. § 119 to U.S. Provisional Patent Application No. 62/939,254 by Yang et al., filed 22 Nov. 2019 and entitled "PROBABILISTIC AMPLITUDE SHAPING," both of which are assigned to the assignee hereof and hereby expressly incorporated by reference herein.

TECHNICAL FIELD

This disclosure relates generally to wireless communication, and more specifically, to identifying and indicating boundaries in bitstreams encoded using an amplitude shaping encoding operation.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4k QAM") will also be implemented. 1024-QAM and 4096-QAM, among other MCSs, involve the use of low-density parity check (LDPC) encoding. An LDPC encoding operation may be performed on the data bits of a code block to, for example, add redundancy for forward error correction (FEC).

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Unfortunately, the channel capacity achievable with LDPC encoding shows a significant gap to the Shannon bound even for high MCSs. Additionally, to be able to use high MCSs, including 1024-QAM and 4096-QAM, a high signal-to-noise ratio (SNR) is required, but it may be difficult to obtain the SNRs needed for such high MCSs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes generating a plurality of data units, each data unit including information bits. The method also includes performing a prefix encoding operation on the information bits in the plurality of data units that generates one or more output bitstreams including amplitude bits for each of the data units based on the information bits in the data units, the performance of the prefix encoding operation including comparing sequences of consecutive bits of the information bits to one or more patterns of bit values of a set of patterns of bit values, each pattern of bit values of the set of patterns of bit values being associated with a respective sequence of amplitude bits of a set of sequences of amplitude bits, each sequence of amplitude bits being associated with a respective symbol amplitude of a set of symbol amplitudes, a number of patterns of bit values in the set of patterns of bit values being less than a number of sequences of amplitude bits in the set of sequences of amplitude bit, The method also includes identifying a boundary in the information bits. The method additionally includes inserting, into the one or more output bitstreams, based on the identified boundary, a sequence of amplitude bits of the set of sequences of amplitude bits that is not associated with any of the patterns of bit values of the set of patterns of bit values, the inserted sequence of amplitude bits indicating the boundary. The method further includes transmitting a wireless packet including a plurality of symbols based on the one or more output bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to generate a plurality of data units, each data unit including information bits. The code, when executed by the at least one processor in conjunction with the at least one modem, also is configured to perform a prefix encoding operation on the information bits in the plurality of data units that generates one or more output bitstreams including amplitude bits for each of the data units based on the information bits in the data units, the performance of the prefix encoding operation including comparing sequences of consecutive bits of the information bits to one or more patterns of bit values of a set of patterns of bit values, each pattern of bit values of the set of patterns of bit values being associated with a respective sequence of amplitude bits of a set of sequences of amplitude bits, each sequence of amplitude bits being associated with a respective symbol amplitude of a set of symbol amplitudes, a number of patterns of bit values in the set of patterns of bit values being less than a number of sequences of amplitude bits in the set of sequences of amplitude bits. The code, when executed by the at least one processor in conjunction with the at least one modem, also is configured to identify a boundary in the information bits. The code, when executed by the at least one processor in conjunction with the at least one modem, is additionally configured to insert, into the one or more output bitstreams, based on the identified boundary, a sequence of amplitude bits of the set of sequences of amplitude bits that is not associated with any of the patterns of bit values of the set of patterns of bit values, the inserted sequence of amplitude bits indicating the boundary. The code, when executed by the at least one processor in conjunction with the at least one modem, is further configured to transmit a wireless packet including a plurality of symbols based on the one or more output bitstreams.

Another innovative aspect of the subject matter described in this disclosure can be implemented in a method for wireless communication. The method includes receiving a wireless packet including a plurality of symbols, each of the symbols having an associated symbol amplitude. The method also includes inserting, into one or more input bitstreams, for each of the symbols in the plurality of symbols, based on the symbol amplitude associated with the respective symbol, a sequence of amplitude bits of a set of sequences of amplitude bits, each sequence of amplitude bits being associated with a respective symbol amplitude of a set of symbol amplitudes, each sequence of amplitude bits of a plurality of the sequences of amplitude bits of the set of sequences of amplitude bits being associated with a respective pattern of bit values of a set of patterns of bit values, a number of patterns of bit values in the set of patterns of bit values being less than a number of sequences of amplitude bits in the set of sequences of amplitude bits. The method also includes identifying, in the one or more input bitstreams, a sequence of amplitude bits of the set of sequences of amplitude bits that is not associated with any pattern of bit values in the set of patterns of bit values. The method also includes identifying a boundary in the one or more input bitstreams based on the identified sequence of amplitude bits. The method also includes removing the identified sequence of amplitude bits from the one or more input bitstreams. The method additionally includes performing a prefix decoding operation on the one or more input bitstreams after removing the identified sequence of amplitude bits that generates one or more output bitstreams including information bits, the prefix decoding operation including comparing sequences of amplitude bits in the one or more input bitstreams to one or more patterns of bit values of the set of patterns of bit values, the set of patterns of bit values having non-uniform lengths, each pattern of bit values of the set of patterns of bit values being associated with a respective sequence of information bits. The method further includes processing information bits in the one or more output bitstreams based on the identified boundary in the one or more input bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to receive a wireless packet including a plurality of symbols, each of the symbols having an associated symbol amplitude. The code, when executed by the at least one processor in conjunction with the at least one modem, also is configured to insert, into one or more input bitstreams, for each of the symbols in the plurality of symbols, based on the symbol amplitude associated with the respective symbol, a sequence of amplitude bits of a set of sequences of amplitude bits, each sequence of amplitude bits being associated with a respective symbol amplitude of a set of symbol amplitudes, each sequence of amplitude bits of a plurality of the sequences of amplitude bits of the set of sequences of amplitude bits being associated with a respective pattern of bit values of a set of patterns of bit values, a number of patterns of bit values in the set of patterns of bit values being less than a number of sequences of amplitude bits in the set of sequences of amplitude bits. The code, when executed by the at least one processor in conjunction with the at least one modem, also is configured to identify, in the one or more input bitstreams, a sequence of amplitude bits of the set of sequences of amplitude bits that is not associated with any pattern of bit values in the set of patterns of bit values. The code, when executed by the at least one processor in conjunction with the at least one modem, also is configured to identify a boundary in the one or more input bitstreams based on the identified sequence of amplitude bits. The code, when executed by the at least one processor in conjunction with the at least one modem, also is configured to remove the identified sequence of amplitude bits from the one or more input bitstreams. The code, when executed by the at least one processor in conjunction with the at least one modem, is additionally configured to perform a prefix decoding operation on the one or more input bitstreams after removing the identified sequence of amplitude bits that generates one or more output bitstreams including information bits, the prefix decoding operation including comparing sequences of amplitude bits in the one or more input bitstreams to one or more patterns of bit values of the set of patterns of bit values, the set of patterns of bit values having non-uniform lengths, each pattern of bit values of the set of patterns of bit values being associated with a respective sequence of information bits. The code, when executed by the at least one processor in conjunction with the at least one modem, is further configured to process information bits in the one or more output bitstreams based on the identified boundary in the one or more input bitstreams.

Another innovative aspect of the subject matter described in this disclosure can be implemented in a method for wireless communication. The method includes generating a plurality of data units, each data unit including information bits. The method also includes performing an encoding operation on the information bits in the plurality of data units to generate one or more output bitstreams including amplitude bits based on the information bits. The method also includes monitoring a length of the amplitude bits in the one or more output bitstreams during the performance of the encoding operation. The method also includes stopping the encoding operation on the information bits at an end of a current fixed-length segment of the information bits of a plurality of fixed-length segments of the information bits responsive to the length of the amplitude bits in the one or more output bitstreams reaching a threshold. The method additionally includes adding padding bits to the one or more output bitstreams after stopping the prefix encoding operation until a length of one or more of the output bitstreams is equal to an integer multiple of fixed-length segments of the information bits. The method further includes transmitting a wireless packet including a plurality of symbols based on the one or more output bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to perform an encoding operation on the information bits in the plurality of data units to generate one or more output bitstreams including amplitude bits based on the information bits. The code, when executed by the at least one processor in conjunction with the at least one modem, also is configured to monitor a length of the amplitude bits in the one or more output bitstreams during the performance of the encoding operation. The code, when executed by the at least one processor in conjunction with the at least one modem, also is configured to stop the encoding operation on the information bits at an end of a current fixed-length segment of the information bits of a plurality of fixed-length segments of the information bits responsive to the length of the amplitude bits in the one or more output bitstreams reaching a threshold. The code, when executed by the at least one processor in conjunction with the at least one modem, is additionally configured to add padding bits to the one or more output bitstreams after stopping the prefix encoding operation until a length of one or more of the output bitstreams is equal to an integer multiple of fixed-length segments of the information bits. The code, when executed by the at least one processor in conjunction with the at least one modem, is further configured to transmit a wireless packet including a plurality of symbols based on the one or more output bitstreams.

Another innovative aspect of the subject matter described in this disclosure can be implemented in a method for wireless communication. The method includes receiving a wireless packet including a plurality of symbols, each of the symbols having an associated symbol amplitude. The method also includes inserting, into one or more input bitstreams, for each of the symbols in the plurality of symbols, based on the symbol amplitude associated with the respective symbol, a sequence of amplitude bits of a set of sequences of amplitude bits. The method also includes performing a decoding operation on the one or more input bitstreams to generate one or more output bitstreams including information bits. The method also includes monitoring a length of the amplitude bits in the one or more input bitstreams on which the decoding operation is performed. The method also includes identifying a first boundary in the one or more input bitstreams based on determining that the length of the amplitude bits in the one or more input bitstreams on which the decoding operation is or has been performed equals a first integer multiple of fixed-length segments of the amplitude bits. The method also includes monitoring a length of the information bits generated for the one or more output bitstreams by the decoding operation. The method also includes identifying a second boundary in the one or more output bitstreams based on determining that the length of the information bits generated for the one or more output bitstreams equals a second integer multiple of fixed-length segments of information bits. The method additionally includes removing, from the one or more output bitstreams, one or more information bits after a bit index associated with the first boundary and before a bit index associated with the second boundary. The method further includes processing information bits in the one or more output bitstreams after removing the one or more information bits from the one or more output bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to receive a wireless packet including a plurality of symbols, each of the symbols having an associated symbol amplitude. The code, when executed by the at least one processor in conjunction with the at least one modem, also is configured to insert, into one or more input bitstreams, for each of the symbols in the plurality of symbols, based on the symbol amplitude associated with the respective symbol, a sequence of amplitude bits of a set of sequences of amplitude bits. The code, when executed by the at least one processor in conjunction with the at least one modem, also is configured to perform a decoding operation on the one or more input bitstreams to generate one or more output bitstreams including information bits. The code, when executed by the at least one processor in conjunction with the at least one modem, also is configured to monitor a length of the amplitude bits in the one or more input bitstreams on which the decoding operation is performed. The code, when executed by the at least one processor in conjunction with the at least one modem, also is configured to identify a first boundary in the one or more input bitstreams based on determining that the length of the amplitude bits in the one or more input bitstreams on which the decoding operation is or has been performed equals a first integer multiple of fixed-length segments of the amplitude bits. The code, when executed by the at least one processor in conjunction with the at least one modem, also is configured to monitor a length of the information bits generated for the one or more output bitstreams by the decoding operation. The code, when executed by the at least one processor in conjunction with the at least one modem, also is configured to identify a second boundary in the one or more output bitstreams based on determining that the length of the information bits generated for the one or more output bitstreams equals a second integer multiple of fixed-length segments of information bits. The code, when executed by the at least one processor in conjunction with the at least one modem, is additionally configured to remove, from the one or more output bitstreams, one or more information bits after a bit index associated with the first boundary and before a bit index associated with the second boundary. The code, when executed by the at least one processor in conjunction with the at least one modem, is further configured to process information bits in the one or more output bitstreams after removing the one or more information bits from the one or more output bitstreams.

Another innovative aspect of the subject matter described in this disclosure can be implemented in a method for wireless communication. The method includes generating a plurality of data units, each data unit including information bits. The method also includes performing an encoding operation on the information bits in the plurality of data units to generate one or more output bitstreams including amplitude bits based on the information bits. The method also includes monitoring a length of the information bits on which the encoding operation is performed. The method also includes, for each fixed-length segment of the information bits of a plurality of fixed-length segments of the information bits: determining, during or after the performance of the encoding operation on the fixed-length segment of the information bits, whether a boundary in the one or more output bitstreams is or would be reached based on the performance of the encoding operation on the fixed-length segment of the information bits; responsive to determining that the boundary in the one or more output bitstreams is not or would not be reached based on the performance of the encoding operation on the fixed-length segment of the information bits, inserting, into the one or more output bitstreams before the boundary, one or more sequences of amplitude bits generated based on the fixed-length segment of the information bits; and responsive to determining that the boundary in the one or more output bitstreams is or would be reached based on the performance of the encoding operation on the fixed-length segment of the information bits, not including, in the one or more output bitstreams before the boundary, any amplitude bits generated based on the information bits in the fixed-length segment of the information bits. The method additionally includes adding padding bits to the one or more output bitstreams after a last amplitude bit in the one or more output bitstreams before the boundary such that a length of the amplitude bits in the one or more output bitstreams is aligned with the boundary. The method further includes transmitting a wireless packet including a plurality of symbols based on the one or more output bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to generate a plurality of data units, each data unit including information bits. The method also includes performing an encoding operation on the information bits in the plurality of data units to generate one or more output bitstreams including amplitude bits based on the information bits. The code, when executed by the at least one processor in conjunction with the at least one modem, also is configured to monitor a length of the information bits on which the encoding operation is performed. The code, when executed by the at least one processor in conjunction with the at least one modem, also is configured to, for each fixed-length segment of the information bits of a plurality of fixed-length segments of the information bits: determine, during or after the performance of the encoding operation on the fixed-length segment of the information bits, whether a boundary in the one or more output bitstreams is or would be reached based on the performance of the encoding operation on the fixed-length segment of the information bits; responsive to determining that the boundary in the one or more output bitstreams is not or would not be reached based on the performance of the encoding operation on the fixed-length segment of the information bits, insert, into the one or more output bitstreams before the boundary, one or more sequences of amplitude bits generated based on the fixed-length segment of the information bits; and responsive to determining that the boundary in the one or more output bitstreams is or would be reached based on the performance of the encoding operation on the fixed-length segment of the information bits, not include, in the one or more output bitstreams before the boundary, any amplitude bits generated based on the information bits in the fixed-length segment of the information bits. The code, when executed by the at least one processor in conjunction with the at least one modem, is additionally configured to add padding bits to the one or more output bitstreams after a last amplitude bit in the one or more output bitstreams before the boundary such that a length of the amplitude bits in the one or more output bitstreams is aligned with the boundary. The code, when executed by the at least one processor in conjunction with the at least one modem, is further configured to transmit a wireless packet including a plurality of symbols based on the one or more output bitstreams.

Another innovative aspect of the subject matter described in this disclosure can be implemented in a method for wireless communication. The method includes receiving a wireless packet including a plurality of symbols, each of the symbols having an associated symbol amplitude. The method also includes inserting, into one or more input bitstreams, for each of the symbols in the plurality of symbols, based on the symbol amplitude associated with the respective symbol, a sequence of amplitude bits of a set of sequences of amplitude bits. The method also includes performing a decoding operation on the one or more input bitstreams to generate one or more output bitstreams including information bits. The method also includes monitoring a length of the amplitude bits in the one or more input bitstreams on which the decoding operation is performed. The method also includes identifying a boundary in the one or more input bitstreams based on the monitored length of the amplitude bits. The method also includes monitoring a length of the information bits in the one or more output bitstreams during the decoding operation. The method also includes, responsive to identifying the boundary in the one or more input bitstreams, identifying a boundary in the one or more output bitstreams between a current fixed-length segment of the information bits and a previous fixed-length segment of the information bits of a plurality of fixed-length segments of the information bits. The method additionally includes removing, from the one or more output bitstreams, the information bits in the current fixed-length byte segment of the information bits. The method further includes processing information bits in the one or more output bitstreams after removing the information bits in the current fixed-length byte segment of the information bits from the one or more output bitstreams.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to receive a wireless packet including a plurality of symbols, each of the symbols having an associated symbol amplitude. The code, when executed by the at least one processor in conjunction with the at least one modem, also is configured to insert, into one or more input bitstreams, for each of the symbols in the plurality of symbols, based on the symbol amplitude associated with the respective symbol, a sequence of amplitude bits of a set of sequences of amplitude bits. The code, when executed by the at least one processor in conjunction with the at least one modem, also is configured to perform a decoding operation on the one or more input bitstreams to generate one or more output bitstreams including information bits. The code, when executed by the at least one processor in conjunction with the at least one modem, also is configured to monitor a length of the amplitude bits in the one or more input bitstreams on which the decoding operation is performed. The code, when executed by the at least one processor in conjunction with the at least one modem, also is configured to identify a boundary in the one or more input bitstreams based on the monitored length of the amplitude bits. The code, when executed by the at least one processor in conjunction with the at least one modem, also is configured to monitor a length of the information bits in the one or more output bitstreams during the decoding operation. The code, when executed by the at least one processor in conjunction with the at least one modem, also is configured to, responsive to identifying the boundary in the one or more input bitstreams, identify a boundary in the one or more output bitstreams between a current fixed-length segment of the information bits and a previous fixed-length segment of the information bits of a plurality of fixed-length segments of the information bits. The code, when executed by the at least one processor in conjunction with the at least one modem, is additionally configured to remove, from the one or more output bitstreams, the information bits in the current fixed-length byte segment of the information bits. The code, when executed by the at least one processor in conjunction with the at least one modem, is further configured to process information bits in the one or more output bitstreams after removing the information bits in the current fixed-length byte segment of the information bits from the one or more output bitstreams.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
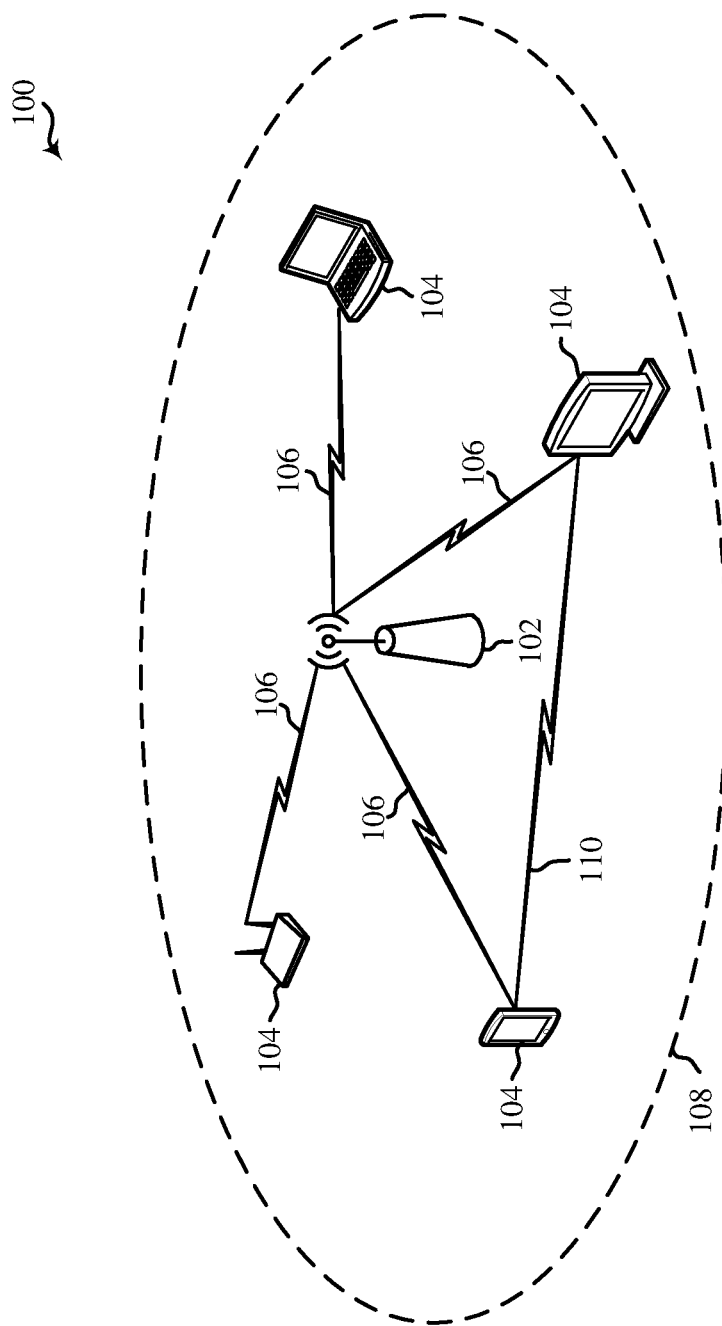
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Because the number of amplitude-shaped bits output from an amplitude shaping encoder may be content dependent, the effective coding rate of the amplitude shaping encoder may be intrinsically variable. Without a fixed coding rate, the boundaries between data units, such as between Medium Access Control (MAC) protocol data units (MPDUs) in an Aggregated MPDU (A-MPDU), may be lost. From the MAC layer perspective, wireless communications are transmitted as frames including MPDUs, and the lengths of the MPDUs are quantized in units of bytes. For example, the MAC layer may package the payload bits in the MPDUs in integer multiples of bytes, such as integer multiples of 4-byte segments. The MAC layer of the receiving device may identify and track the boundaries between the MPDUs based on decoding the MAC delimiters associated with respective MPDUs. In instances in which the decoding of an MPDU delimiter fails, the MAC layer may scan the other MPDU boundaries to find the next MPDU boundary. In conventional systems, if an MPDU is corrupted or otherwise not decoded successfully, the corruption does not affect the remaining MPDUs, and thus, the remaining MPDUs may still be decoded successfully by the receiving device. However, in implementations that employ amplitude-shaping encoding, because the length of the de-shaped bits at the receiving device may be unknown, if an MPDU is corrupted, the receiving device may not be able to track and identify the MPDU boundaries after the corrupted MPDU.

Various aspects relate generally to amplitude shaping encoding, also referred to herein as probabilistic shaping or probabilistic encoding. Particular aspects specifically relate to identifying and indicating boundaries in bitstreams encoded using an amplitude shaping encoding operation. In some aspects, the amplitude shaping encoding is implemented via prefix encoding. In some such aspects, a transmitting device may insert, into one or more output bitstreams, a boundary signature in the form of a sequence of amplitude bits that is not associated with any patterns of bit values in a lookup table (LUT) used for the prefix encoding operation. The inserted sequence of amplitude bits indicates the boundary to the receiving device. In some other aspects, a transmitting device may monitor a length of the amplitude bits in one or more output bitstreams during the performance of the prefix encoding operation and stop the encoding operation on the information bits at an end of a current fixed-length segment of information bits responsive to the length of the amplitude bits in the one or more output bitstreams reaching a threshold. The transmitting device may then add padding bits to the one or more output bitstreams after stopping the prefix encoding operation until a length of one or more of the output bitstreams is equal to an integer multiple of fixed-length segments of the information bits. In some other aspects, a transmitting device may monitor the length of the information bits on which the prefix encoding operation is performed and, for each fixed-length segment determine whether a boundary in the one or more output bitstreams is or would be reached based on the performance of the prefix encoding operation on the fixed-length segment of the information bits. Responsive to determining that a boundary in the one or more output bitstreams is or would be reached, the transmitting device may not include, in the one or more output bitstreams before the boundary, any amplitude bits generated based on the information bits in the fixed-length segment of the information bits, and add padding bits after a last amplitude bit in the one or more output bitstreams before the boundary such that a length of the amplitude bits in the one or more output bitstreams is aligned with the boundary.

Particular implementations of the subject matter described in this disclosure can be implemented to realize one or more of the following potential advantages. In some implementations, the described techniques can be used by a transmitting device to identify and indicate, and a receiving device to detect and track, boundaries, such as boundaries between MPDUs or groups of information bits, to facilitate successful decoding by the receiving device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
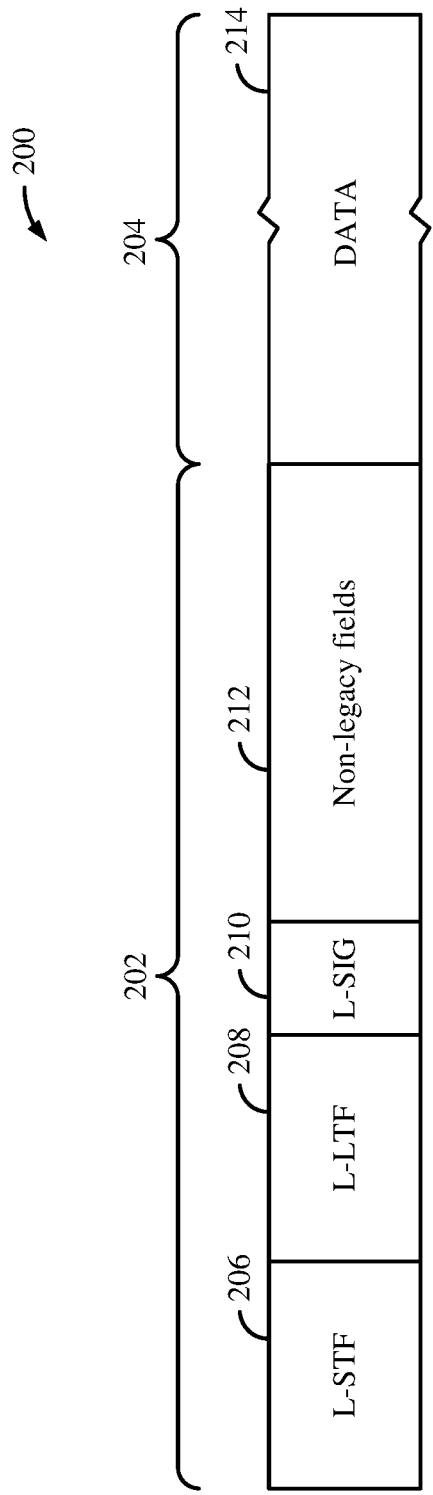
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 110, which may consist of two BPSK symbols. The legacy portion of the preamble 202 may be configured according to the IEEE 802.11a wireless communication protocol standard. The preamble 202 may also include a non-legacy portion including one or more non-legacy fields 112, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 110 generally enables a receiving device to determine a duration of the PDU and to use the determined duration to avoid transmitting on top of the PDU. For example, the L-STF 206, the L-LTF 208 and the L-SIG 110 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 114 that, in turn, may carry higher layer data, for example, in the form of medium access control (MAC) protocol data units (MPDUs) or an aggregated MPDU (A-MPDU).

Figure 2B:
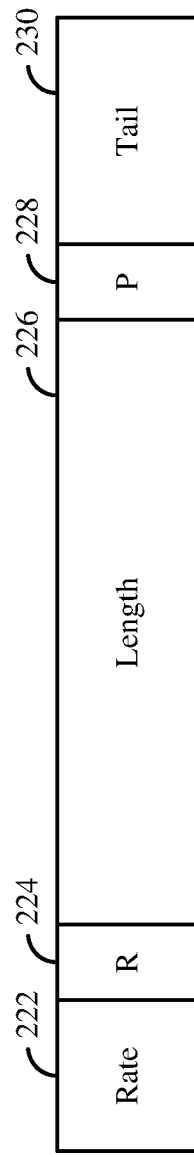
FIG. 2B shows an example field in the PDU of FIG. 2A.

FIG. 2B shows an example L-SIG 110 in the PDU 200 of FIG. 2A. The L-SIG 110 includes a data rate field 222, a reserved bit 224, a length field 226, a parity bit 228, and a tail field 130. The data rate field 222 indicates a data rate (note that the data rate indicated in the data rate field 112 may not be the actual data rate of the data carried in the payload 204). The length field 226 indicates a length of the packet in units of, for example, symbols or bytes. The parity bit 228 may be used to detect bit errors. The tail field 130 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
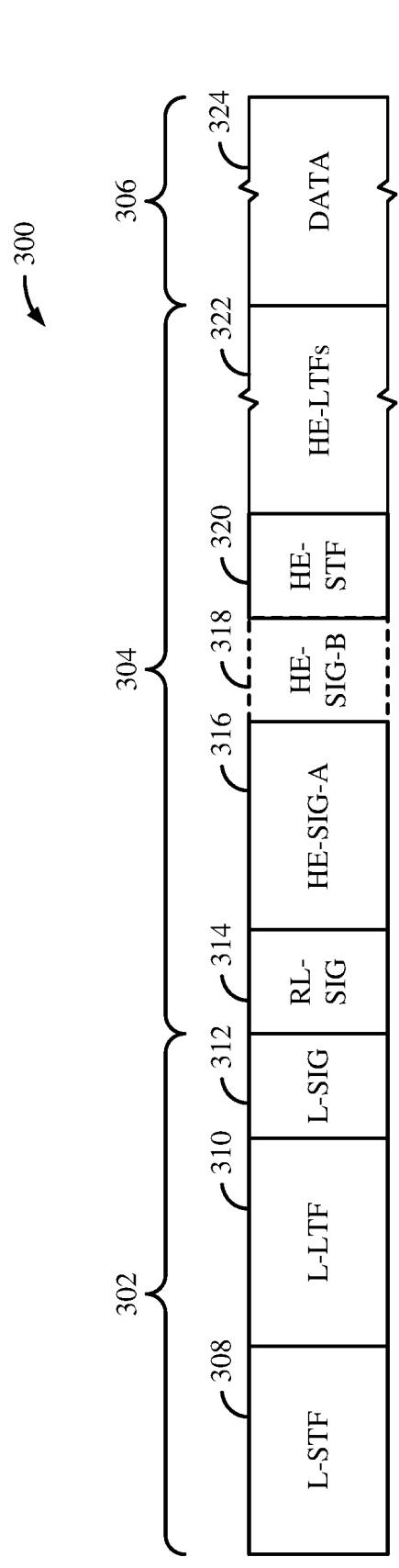
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
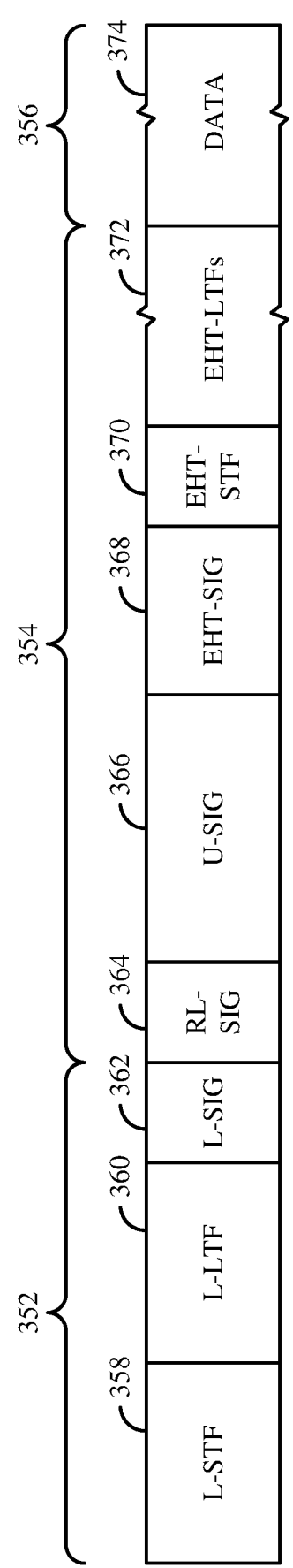
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
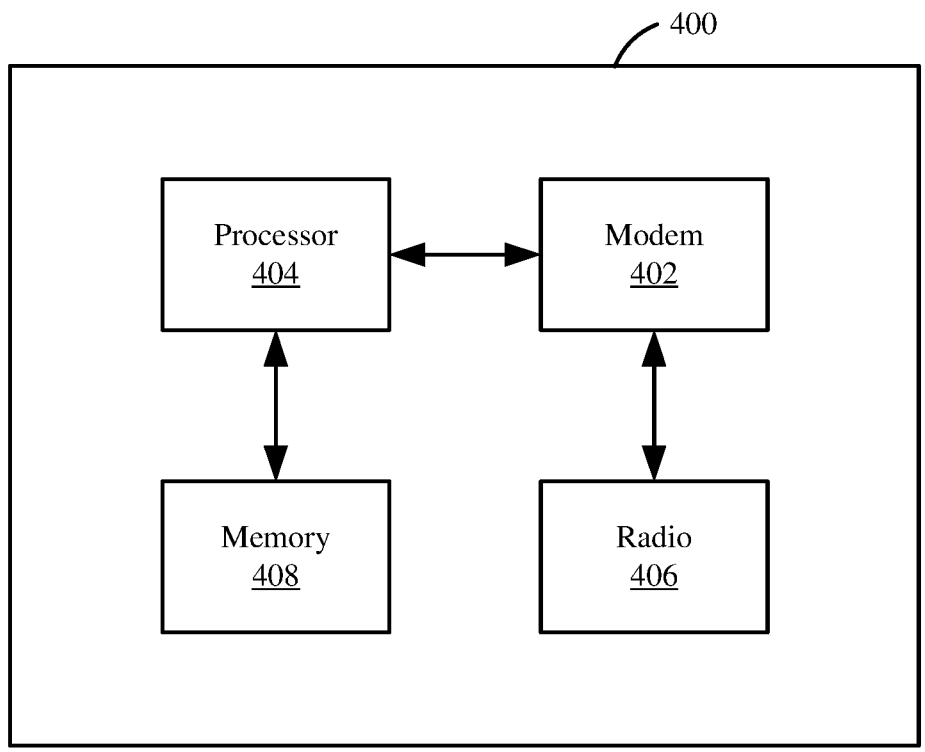
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more processors, processing blocks or processing elements 404 (collectively "the processor 404") coupled with the modem 402. In some implementations, the wireless communication device 400 additionally includes one or more radios 406 (collectively "the radio 406") coupled with the modem 402. In some implementations, the wireless communication device 400 further includes one or more memory blocks or elements 408 (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, automatic gain control (AGC) circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
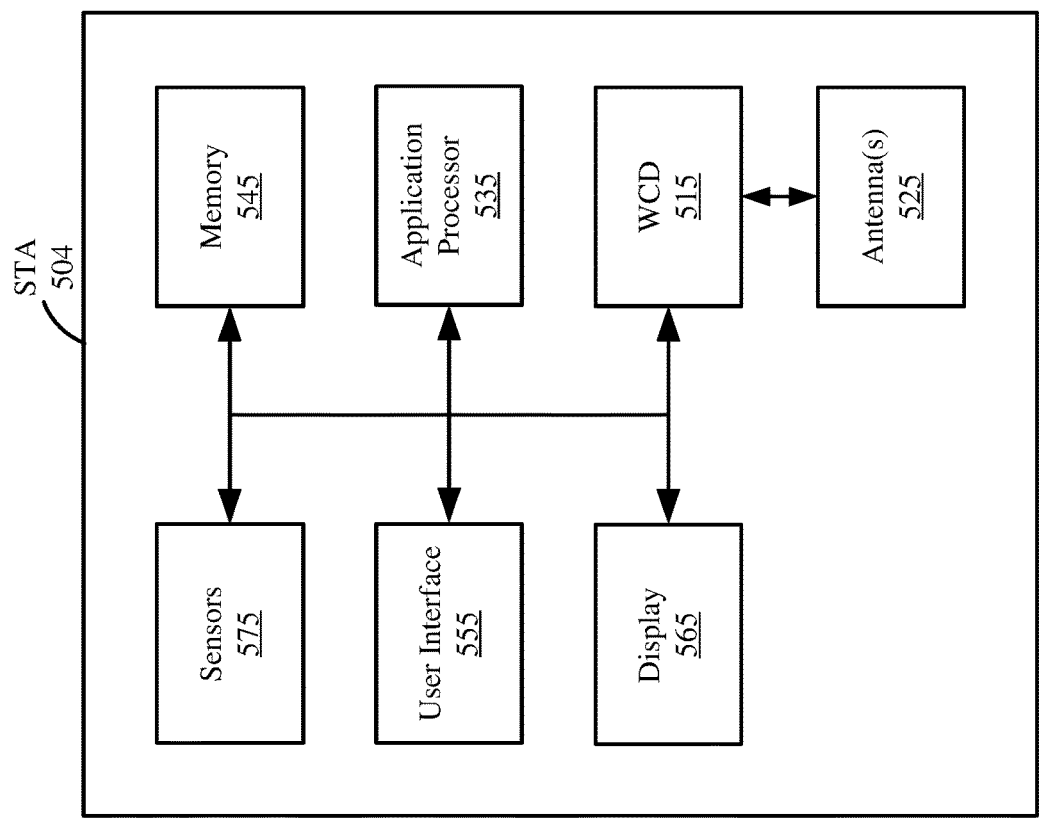
FIG. 5B shows a block diagram of an example station (STA).
Figure 5A:
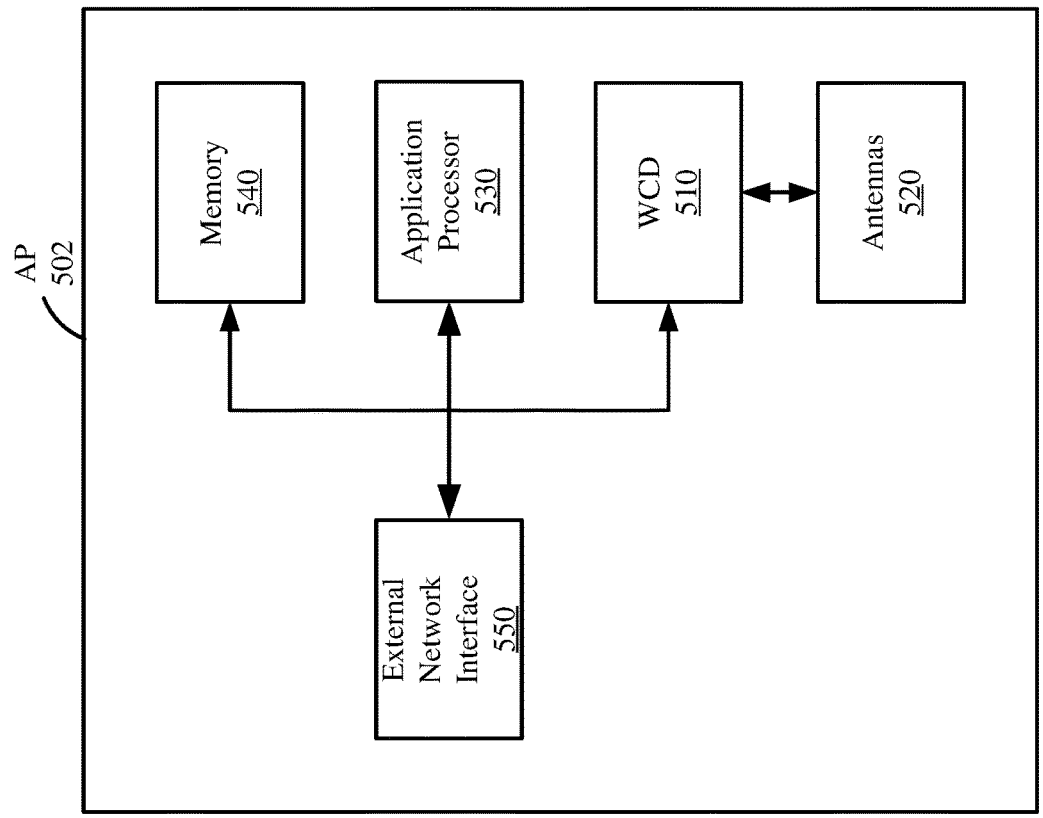
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4k QAM") will also be implemented. 1024-QAM and 4096-QAM, among other MCSs, involve the use of low-density parity check (LDPC) encoding. For example, a PHY layer of the transmitting device may receive one or more MPDUs or A-MPDUs from a MAC layer of the transmitting device in the form of a PSDU. The PSDU may be arranged into multiple code blocks, each of which contains primary information (or "systematic information") representative of some or all of one or more of the MPDUs in the form of information bits. Some of the information bits (also referred to herein as "amplitude bits") in the code block are used to determine the amplitudes of the symbols to be modulated and transmitted to the receiving device. An LDPC encoding operation may be performed on the information bits in the code block to, for example, encode the data bits to add redundancy for forward error correction. Because LDPC encoding is an example of systematic encoding, the LDPC encoding operation does not change the data bits; rather, the amplitude bits output from the LDPC encoder are the same as the amplitude bits input to the LDPC encoder. In other words, the values of the amplitude bits used for the modulation come directly from the initial code block.

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Equation (1) below shows one representation of the Shannon-Hartley theorem.

$$C=B \log_2(1+SNR) \quad (1)$$

In Equation (1), C represents the channel capacity in bits per second, B represents the bandwidth in hertz, and SNR represents the signal-to-noise ratio defined as the ratio of the average received signal power to the average power of the noise and interference. Unfortunately, the channel capacity achievable with LDPC encoding shows a significant gap to the Shannon bound even for high MCSs. Additionally, to be able to use high MCSs, including 1024-QAM and 4096-QAM, high SNR is required, but it may be difficult to obtain the SNRs needed for such high MCSs.

This disclosure provides methods, devices and systems for encoding data for wireless communication to achieve a desired amplitude distribution. Some implementations more specifically relate to performing an encoding operation to shape the amplitudes of the resultant symbols such that the amplitudes have a non-uniform distribution. In some implementations of the non-uniform distribution, the probabilities associated with the respective amplitudes generally increase with decreasing amplitude. Some implementations enable the tracking of MPDU boundaries to facilitate successful decoding by a receiving device. Additionally or alternatively, some implementations enable the determination of a packet length after performing the amplitude shaping, which enables a transmitting device to determine the number of padding bits to add to the payload and to signal the packet length to a receiving device so that the receiving device may determine the duration of the packet.

Figure 6:
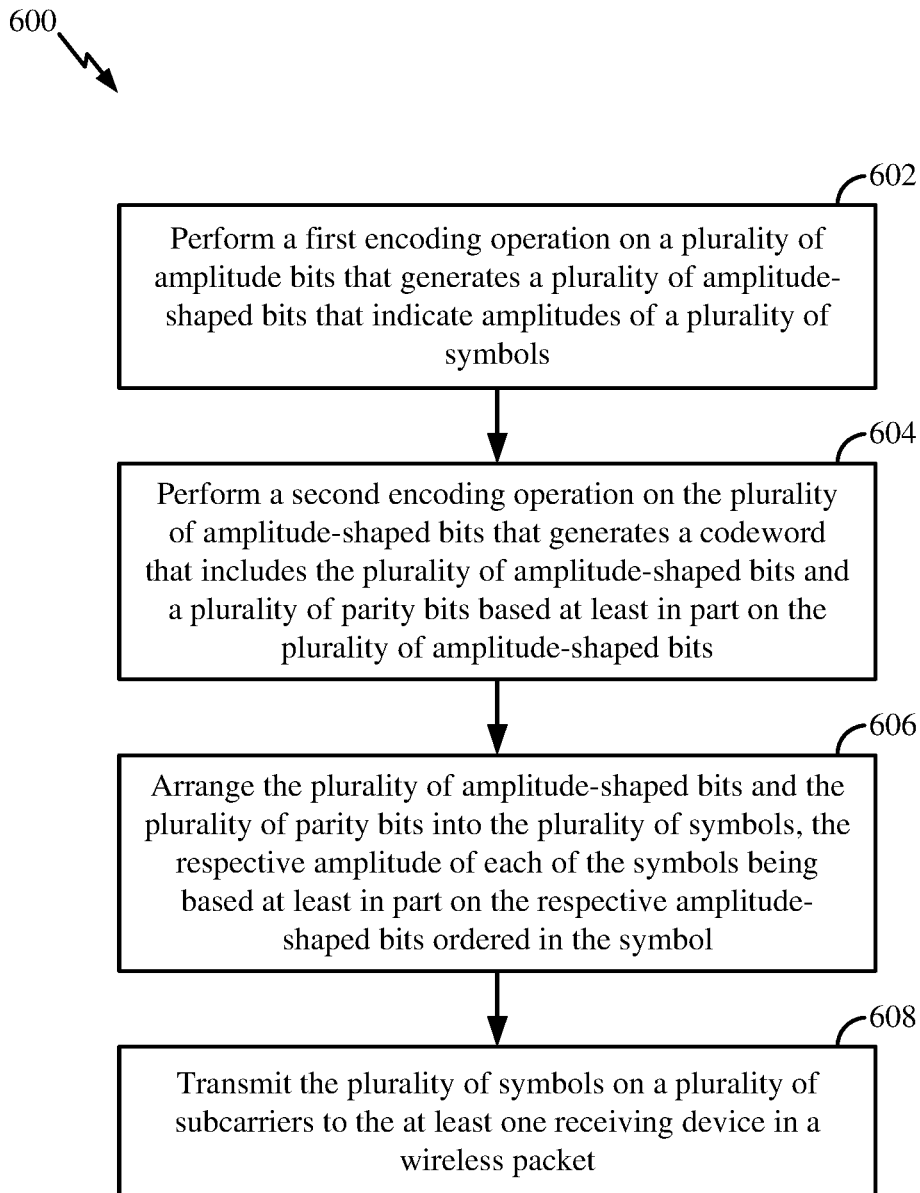
FIG. 6 shows a flowchart illustrating an example process for wireless communication that supports amplitude shaping according to some implementations.

FIG. 6 shows a flowchart illustrating an example process 600 for wireless communication that supports amplitude shaping according to some implementations. The operations of the process 600 may be implemented by a transmitting device or its components as described herein. For example, the process 600 may be performed by a wireless communication device such as the wireless communication device 400 described with reference to FIG. 4. In some implementations, the process 600 may be performed by a wireless communication device operating as or within an AP, such as one of the APs 102 and 502 described with reference to FIGS. 1 and 5A, respectively. In some other implementations, the process 600 may be performed by a wireless communication device operating as or within a STA, such as one of the STAs 104 and 504 described with reference to FIGS. 1 and 5B, respectively.

In block 602, the wireless communication device performs a first encoding operation on a plurality of amplitude bits that generates a plurality of amplitude-shaped bits that indicate amplitudes of a plurality of symbols. In some implementations, the first encoding operation encodes the plurality of amplitude bits to generate the plurality of amplitude-shaped bits such that the amplitudes of the resultant symbols have a non-uniform distribution. In block 604, the wireless communication device performs a second encoding operation on the plurality of amplitude-shaped bits that generates a codeword that includes the plurality of amplitude-shaped bits and a plurality of parity bits based at least in part on the plurality of amplitude-shaped bits. In block 606, the wireless communication device arranges the plurality of amplitude-shaped bits and the plurality of parity bits into the plurality of symbols, the respective amplitude of each of the symbols being based at least in part on the respective amplitude-shaped bits ordered in the symbol. In block 608, the wireless communication device transmits the plurality of symbols on a plurality of subcarriers to at least one receiving device in a wireless packet.

In some implementations, the performance of the first encoding operation (also referred to herein as an "amplitude-shaping encoding operation" or simply an "amplitude shaping operation") in block 602 encodes the plurality of amplitude bits to generate the plurality of amplitude-shaped bits such that the non-uniform distribution of the amplitudes of the symbols is a distribution in which the probabilities associated with the respective amplitudes generally increase with decreasing amplitude. For example, the non-uniform distribution may be approximately Gaussian centered around the center point (0,0) of the modulation constellation. As described above, such amplitude shaping may be used to increase the SNR and the channel capacity enabling greater throughput.

In some implementations, prior to performing the first encoding operation in block 602, a MAC layer of the wireless communication device generates an A-MPDU that includes a plurality of MPDUs. Each MPDU includes a plurality of data bits including a plurality of information bits (also referred to as "payload bits") as well as a plurality of control bits or a plurality of signaling bits (for example, MAC signaling bits). The first encoding operation may be performed in block 602 on all or a subset of the data bits in the MPDUs. For example, the information bits in each MPDU may be, or may include, a plurality of bits (amplitude bits) to be used for determining the amplitudes of the symbols. In some implementations, the first encoding operation may be performed in block 602 on only the amplitude bits. Additionally, in some implementations, to reduce complexity or because of the effective resultant coding rate, it may be sufficient or advantageous to perform the first encoding operation in block 602 on, for example, only the most significant bits (MSBs) of the amplitude bits (for example, if four bits are normally used to encode an amplitude component of a symbol, the number of MSBs may be three for each symbol). In such implementations, the first encoding operation is not performed on the remaining least significant bits (LSBs) of the amplitude bits.

Based on an MCS selected for transmission, the PHY layer may package the data bits in the MPDUs (either before or after performing the first encoding operation in block 602) into code blocks to be transmitted using M symbols. Each of the M symbols ultimately includes a set of n amplitude bits indicating at least one amplitude of the symbol. In some implementations, a first n/2 bits of the set of n amplitude bits for each symbol may indicate a first amplitude component of the amplitude of the symbol along a real axis of the modulation constellation, and a second n/2 bits of the set of n amplitude bits for each symbol of the M symbols may indicate a second amplitude component of the amplitude of the symbol along an imaginary axis of the modulation constellation. As such, there may be $2^{n/2}$ possible first amplitude levels for the first (real) amplitude component of each symbol, and $2^{n/2}$ possible second amplitude levels for the second (imaginary) amplitude component of each symbol.

Each of the M symbols may further include a sign bit for each of the amplitude components that indicates the sign of the respective amplitude. For example, when using QAM, a first sign bit of a pair of sign bits for each QAM symbol may indicate whether the respective first amplitude component along the real axis (the in-phase (i) component) is positive or negative, and the second sign bit of the pair of sign bits may indicate whether the respective second amplitude component along the imaginary axis (the quadrature (q) component) is positive or negative. As such, the first and the second amplitude components combine to provide the overall amplitude of the respective QAM symbol, and the first and the second sign bits combine to indicate the quadrant of the modulation constellation the overall amplitude lies in. For example, when using 1024-QAM, each symbol may include ten encoded bits in which a first four of the bits indicate the first (real) amplitude, another four of the bits indicate the second (imaginary) amplitude, another one of the bits indicates the sign (positive or negative) of the first amplitude, and another one of the bits indicates the sign (positive or negative) of the second amplitude.

Figure 7A:
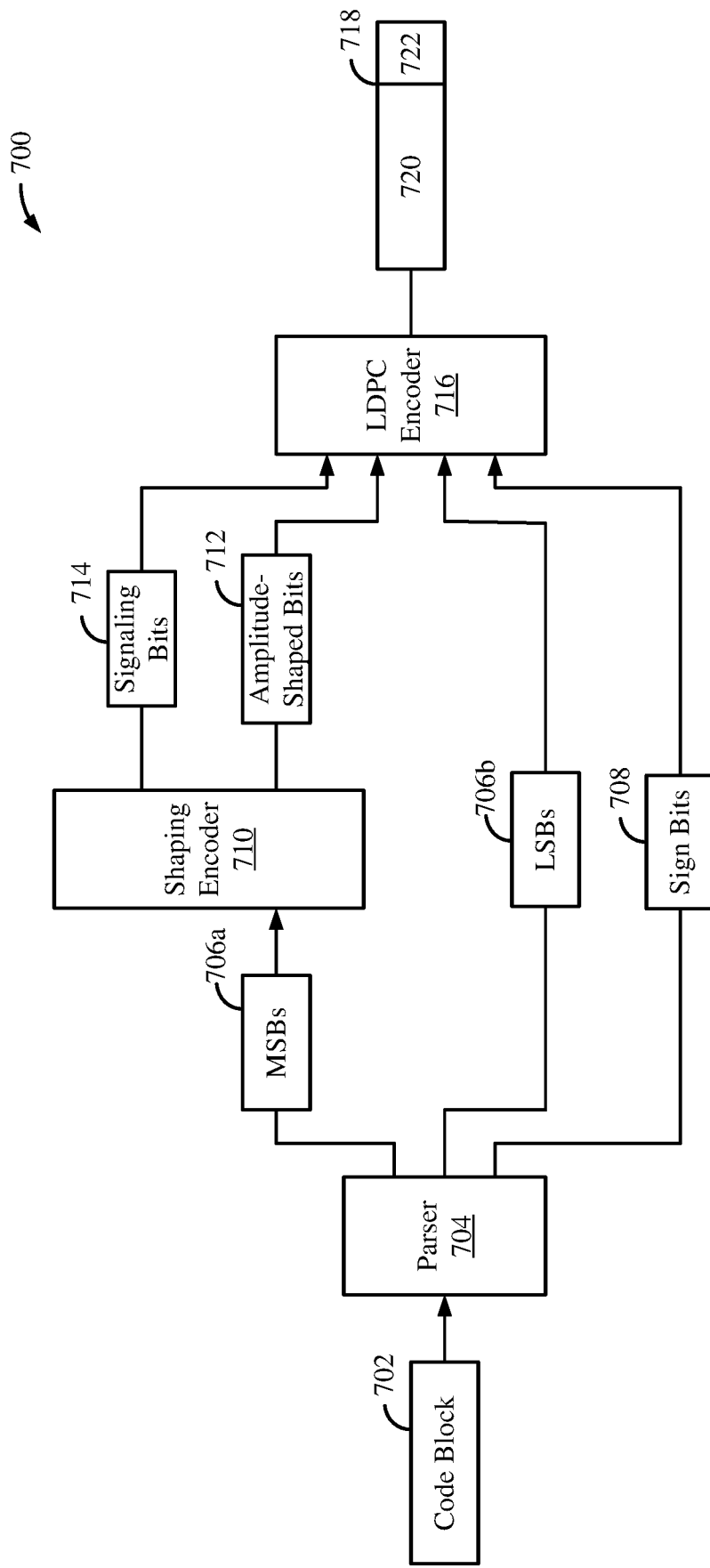
FIGS. 7A and 7B show a diagram of a flow that supports amplitude shaping according to some implementations.
Figure 7B:
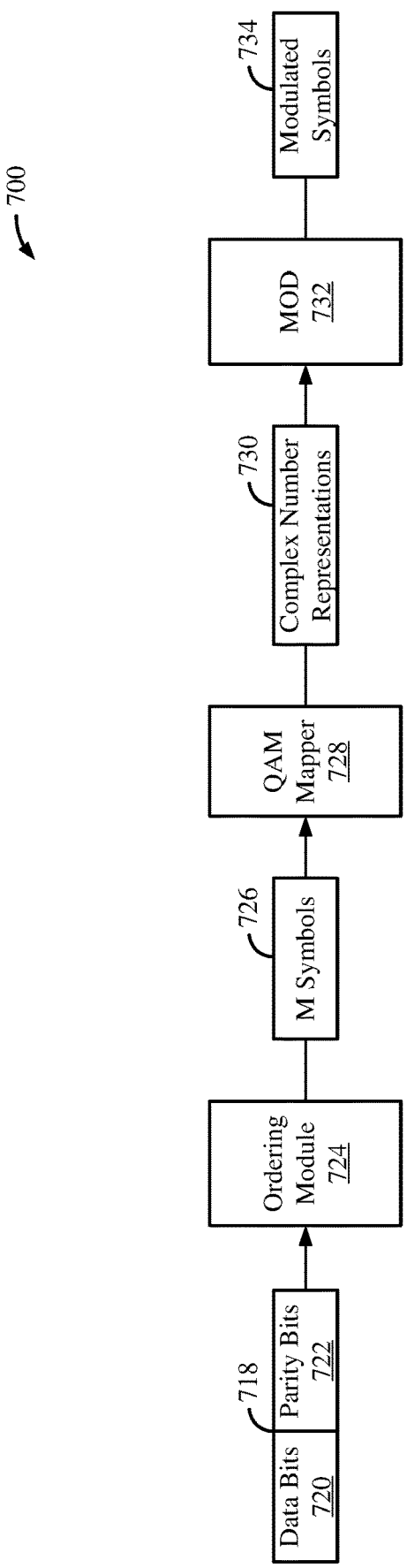

FIGS. 7A and 7B show a diagram of a flow 700 that supports amplitude shaping according to some implementations. For example, the flow 700 may illustrate aspects of the process 600. In the illustrated example, an information block 702 is provided to a pre-shaping parser 704 to obtain the plurality of amplitude bits on which a shaping encoder 710 will perform the first encoding operation in block 602. For example, the pre-shaping parser 704 may separate or divide amplitude bits 706 from sign bits 708 in the information block 702. In some implementations, the parser also separates or divides the amplitude bits into MSBs 706a and LSBs 706b. In some implementations, the plurality of amplitude bits provided to the shaping encoder 710 includes only the MSBs 706a of the amplitude bits 706. In some other implementations, the plurality of amplitude bits may include all of the amplitude bits 706. In the illustrated example, the shaping encoder 710 performs the first encoding operation on the MSBs 706a in block 602 to generate amplitude-shaped bits 712.

In some implementations, to perform the first encoding operation in block 602, and in particular, to obtain the set of n amplitude bits (eight in the 1024-QAM example) that indicate the first and the second amplitude components, the pre-shaping parser 704 (or the shaping encoder 710 itself) may further parse the plurality of amplitude bits (for example, the MSBs 706a) into a first stream of amplitude bits that will define the first amplitude components for the symbols when coded, and a second stream of amplitude bits that will define the second amplitude components for the symbols when coded. For example, in some implementations, a QAM flow is implemented via two independent pulse amplitude modulation (PAM) flows. In some such implementations, the shaping encoder 710 may perform the first encoding operation on the first stream of amplitude bits to provide a first PAM symbol stream in parallel with independently performing the first encoding operation on the second stream of amplitude bits to provide a second PAM symbol stream (which may ultimately be combined with the first PAM symbol stream to obtain a QAM symbol stream).

In some implementations, the performance of the first encoding operation in block 602 adds redundancy to the plurality of amplitude bits (the MSBs 706a in the example of FIGS. 7A and 7B) to generate the amplitude-shaped bits 712 such that the amplitude-shaped bits 712 include more bits than the plurality of amplitude bits input to the shaping encoder 710. By adding redundancy, the shaping encoder 710 may encode the MSBs 706a to generate the amplitude-shaped bits 712 such that the amplitudes of the associated symbols have a non-uniform distribution, and specifically, a distribution in which the probabilities associated with the respective amplitudes generally increase with decreasing amplitude, such as a Gaussian distribution.

In some implementations, the first encoding operation performed in block 602 is or includes an arithmetic encoding operation. In some such implementations, the performance of the arithmetic encoding operation in block 602 includes defining a first distribution of M first (real) amplitudes into $2^{b/2}$ bins, each bin being associated with a respective one of $2^{b/2}$ possible amplitude levels and having an associated size (for example, the size being equal to the number of instances of an amplitude of the respective amplitude level in the bin). Similarly, the performance of the arithmetic encoding operation also includes defining a second distribution of M second (imaginary) amplitudes into $2^{b/2}$ bins, each bin being associated with a respective one of $2^{b/2}$ possible amplitude levels and having an associated size (for example, the size being equal to the number of instances of an amplitude of the respective amplitude level in the bin). In such implementations, b equals n if the plurality of amplitude bits provided to the shaping encoder 706 includes all of the amplitude bits in the information block. However, if the plurality of amplitude bits comprises less than all of the data bits in the information block, for example, only the MSBs 706a of the amplitude bits 706, b may equal the number of MSBs of the n bits for each symbol (for example, for 1024-QAM, b may be equal to six when n is equal to eight such that three of the four amplitude bits for the real amplitude component are selected for the first encoding operation, and such that three of the four amplitude bits for the imaginary amplitude component are selected for the first encoding operation).

In some implementations, to achieve a non-uniform distribution of amplitudes, the sizes of the bins in the first distribution are initially not uniform, and the sizes of the bins in the second distribution are initially not uniform. To achieve a non-uniform distribution in which the probabilities associated with the respective amplitudes generally increase with decreasing amplitude, a size of at least a lowest bin of the bins in each of the first and the second distributions is configured to be greater than a size of at least a highest bin of the bins in the respective one of the first and the second distributions. However, during the arithmetic encoding operation performed in block 602, the sizes of the bins may dynamically change as amplitudes are selected from the bins.

The performance of the arithmetic encoding operation in block 602 includes, for each symbol of the M symbols, selecting, for the first amplitude component, a first (real) amplitude from one of the bins in the first distribution and selecting, for the second amplitude component, a second (imaginary) amplitude from one of the bins in the second distribution. For example, during the arithmetic encoding operation in block 602, the shaping encoder 710 may select, from the first distribution (and thus for the real amplitude component), either an upper half or a lower half of the distribution based on a value of a first bit of the first stream of amplitude bits. Similarly, the shaping encoder 710 may select, from the second distribution (and thus for the imaginary amplitude component), either an upper half or a lower half of the distribution based on a value of a first bit of the second stream of amplitude bits. In this way, each input data bit of a given one of the first and the second streams of amplitude bits defines a binary choice. In other words, the amplitude distribution associated with the respective amplitude component shrinks by a factor of two with each additional input data bit per symbol provided by the respective stream of amplitude bits.

In some other implementations, the first encoding operation performed in block 602 is or includes a prefix encoding operation. In some such implementations, the performance of the prefix encoding operation in block 602 includes, for each symbol of the M symbols, and for each of the first (real) and second (imaginary) amplitude components, comparing one or more patterns of a set of $2^{b/2}$ patterns of bit values of various lengths to bits of the plurality of amplitude bits input to the shaping encoder 710. Again, in such implementations, b equals n if the plurality of amplitude bits provided to the shaping encoder 706 includes all of the data bits in the code block. However, if the plurality of amplitude bits comprises less than all of the data bits in the code block, for example, only the MSBs 706a of the amplitude bits 706, b may equal the number of MSBs of the n bits for each symbol. Each of the patterns in the set of patterns may be associated with a respective amplitude level of the $2^{b/2}$ possible first (real) amplitude levels or the $2^{b/2}$ possible second (imaginary) amplitude levels. In this way, each of the amplitude levels is associated with a respective probability of occurrence associated with a probability mass function. In some implementations, the set of patterns and associated probability mass function are based on a Huffman algorithm. In some implementations, the probability mass function is dyadic, that is, all probabilities in the probability mass function are a negative power of 2.

For example, the shaping encoder 710 may input bits of the plurality of amplitude bits (for example, the MSBs 706a) into a look-up table (LUT) that includes the set of patterns that implement the probability mass function. In some such implementations, the shaping encoder 710 includes a first LUT for determining the first (real) amplitude components for the first PAM symbol stream based on the first stream of amplitude bits, and a second LUT for determining the second (imaginary) components for the second PAM symbol stream based on the second stream of amplitude bits. The first and the second LUTs may initially be identical in some implementations; however, as described below, the first and the second LUTs may each be independently, dynamically-adjusted or switched-out for a more desirable LUT as the prefix encoding operation progresses in block 602.

In some implementations, the performance of the prefix encoding operation in block 602 further includes identifying a match between bits of the plurality of amplitude bits (for example, the MSBs 706a) and one of the patterns. For example, the shaping encoder 710 may compare consecutive bits of the plurality of amplitude bits to the patterns in the LUT. Generally, with each additional data bit that is input to the LUT 900 and matched, the number of possible matching patterns decreases until only one of the patterns is remaining, which is then selected by the shaping encoder 710. In other words, the shaping encoder 710 may, in block 602, compare numbers of next consecutive input bits of the respective stream of amplitude bits with one, some or all of the respective patterns in the LUT. Responsive to finding a match, the shaping encoder 710 may output a set of b/2 amplitude-shaped bits 712 for the respective PAM symbol indicating the amplitude level associated with the respective pattern. In some implementations, the shaping encoder 710 may generally output an average number of amplitude-shaped bits 712 per PAM symbol as defined in Equation (2) below.

$$\# \text{ of bits} = \sum_k -p_k \log_2 p_k$$

In Equation (2), $p_k$ is the probability associated with a respective number k of input data bits. For example, based on the probability mass function associated with the LUT, the number of amplitude-shaped bits 712 output per PAM symbol would be 2.6875 bits; that is, the effective coding rate to encode eight different amplitude levels would be reduced from the 3 typically required down to 2.6875 as a result of the amplitude shaping.

As described above, after performing the first encoding operation on the plurality of amplitude bits (for example, the MSBs 706a) in block 602 to generate the amplitude-shaped bits 712, a second encoding operation may then be performed on the amplitude-shaped bits 712 in block 604. For example, a second encoder 716 may receive a code block that includes the amplitude-shaped bits 712, and perform the second encoding operation in block 604 on the code block to generate a codeword 718 that includes a second plurality of coded data bits 720. In the illustrated example, the second encoder 716 performs the second encoding operation in block 604 on the amplitude-shaped bits 712 (based on the MSBs 706a) as well as on the LSBs 706b and the sign bits 708. Additionally, in implementations in which the shaping encoder generates signaling bits 714, such signaling bits may also be input to the second encoder 716 and encoded in the second encoding operation in block 604.

In some implementations, the second encoder 716 is a systematic encoder that performs a systematic encoding operation in block 604 such that the bits output from the second encoder 716 match those input to the second encoder. For example, in some such implementations, the second encoding operation performed is or includes a low-density parity check (LDPC) encoding operation (and as such, the second encoder 716 may hereinafter be referred to as the "LDPC encoder 716"). As such, the resultant second plurality of coded data bits 720 may include the amplitude-shaped bits 712, the LSBs 706b, the sign bits 708 and the signaling bits 714.

The performance of the LDPC encoding operation in block 604 adds redundancy to the data, for example, by generating a plurality of parity bits 722 based on the amplitude-shaped bits 712, the LSBs 706b, the sign bits 708 and the signaling bits 714. The parity bits 722 add redundancy to the data, for example, for forward error correction purposes, without changing the data. As such, for each code block input to the LDPC encoder 716, the resultant codeword 718 includes a systematic portion that contains the amplitude-shaped bits 712, the LSBs 706b, the sign bits 708 and the signaling bits 714 (collectively the second plurality of coded data bits 720), and a parity portion that contains the parity bits 722.

Upon performing the second encoding operation in block 604 to generate the codeword 718, the wireless communication device, in block 606, orders (or "arranges") the bits of the second plurality of coded data bits 720 and the plurality of parity bits 722 into M (for example, QAM) symbols 726 such that each symbol includes a set of n bits indicating an amplitude in the modulation constellation. For example, as shown in FIG. 7B, an ordering (or "reordering") module 724 may receive the codeword 718 and arrange bits from the amplitude-shaped bits 712, the LSBs 706b, the sign bits 708 and the parity bits 722 into the M symbols 726. In some such implementations, the ordering module 724 receives the amplitude-shaped bits 712, the LSBs 706b, the sign bits 708 and the parity bits 722 associated with both of the first and the second PAM symbol streams and reorders them into a single QAM symbol stream. In one 1024-QAM example in which each symbol 726 includes ten bits including n=8 amplitude bits of which b=6 are the MSBs, the ordering module 724 may take from the codeword 718, for each of the symbols 726, a set of three amplitude bits from the amplitude-shaped bits 712 encoded from the first stream of amplitude bits as well as an amplitude bit from the LSBs 706b associated with the first stream of amplitude bits in order to obtain the first (real) amplitude component. Similarly, the ordering module 724 may take from the codeword 718, for each of the symbols 726, a set of three amplitude bits from the amplitude-shaped bits 712 encoded from the second stream of amplitude bits as well as an amplitude bit from the LSBs 706b associated with the second stream of amplitude bits in order to obtain the second (imaginary) amplitude component.

As described above, each of the symbols 726 may further include a pair of sign bits indicating one of the four quadrants in the modulation constellation in which the amplitude is located. In some implementations, the ordering module 724 may attempt to take all of the sign bits needed for the symbols 726 from the parity bits 722. As described above, because the sign bits do not impact the power, it may be generally satisfactory to perform the amplitude shaping operation on only the amplitude bits 706, and in some implementations, only the MSBs 706a. For example, based on the selected MCS, the shaping encoder 710 is aware, on a code-block basis, how many parity bits will be generated by the LDPC encoder 716. As such, the shaping encoder 710 will know if some data bits will need to be used for sign bits in advance of the first encoding operation. For example, depending on the LDPC coding rate and QAM constellation size, it may be possible that all of the parity bits 722, as well as some unshaped data bits (for example, the sign bits 708), are used as sign bits in the symbols 726. This may be desirable because it means that the amplitudes of all of the M symbols 726 can be shaped. If dedicated sign bits 708 are necessary, they may be parsed from the rest of the code block prior to the first encoding operation and passed directly to the LDPC encoder 716 as described above. Alternatively, it may be possible that some parity bits 722 must be used as amplitude bits for the symbols 726 because the number of parity bits 722 is greater than the number of sign bits needed for the symbols 726. In such instances, the shaping encoder 710 may not be capable of performing the first encoding operation on, and thereby amplitude shaping, all amplitude components for all of the symbols 726 in block 602. As such, the achievable SNR gain may be reduced.

In block 608, the wireless communication device transmits the M symbols 726 on a plurality of subcarriers to the receiving device in a wireless packet. In some implementations, to transmit each of the symbols 726 in block 610, a constellation mapper (for example, a QAM mapper) 728 maps each of the symbols 726 to a point in a (for example, QAM) modulation constellation to obtain, for example, complex number representations 730 indicating the amplitudes and phases of the symbols 726. In some implementations, the constellation mapper 728 includes a plurality of constellation mappers, one for each of a plurality of streams of the symbols 726.

In some implementations, the ordering module 724 also may include a spatial stream parser that parses the symbols 726 into a plurality of spatial streams. In some such implementations, the spatial stream parser parses the amplitude-shaped bits 712, the LSBs 706b, the sign bits 708 and the parity bits 722 separately for each of the spatial streams to ensure that the bits are properly arranged into the symbols in the different spatial streams. In some implementations, the ordering module 724 additionally includes a plurality of bandwidth segment parsers that parse the symbols 726 from the spatial streams into different bandwidth segments (for example, different 80 MHz subchannels of a 160 MHz or 320 MHz bonded channel). After spatial stream parsing and bandwidth segment parsing (if performed), each of the different streams of parsed symbols 726 may be provided to a respective one of the constellation mappers that maps the symbols to points in the modulation constellation to obtain a respective stream of complex number representations 730.

A modulator 732 may then modulate the subcarriers of the bandwidth segments of the wireless channel based on the amplitudes and phases indicated by the complex number representations 730 to generate modulated symbols 734, which are then transmitted to the receiving device via coupled transmit chains and antennas. For example, continuing the example presented above, after the constellation mapping, the streams of complex number representations 730 may be provided to respective tone mappers of the modulator 732 that map the complex number representations to respective subcarriers (or "tones") of the wireless channel. In some implementations, the modulator 732 further includes a bandwidth segment deparser that deparses the different bandwidth segment streams to a plurality of spatial streams of symbols. The spatial streams may then be provided to a spatial multiplexer that performs spatial mapping on the symbols. The spatially-mapped streams may then be provided to a transform block that performs, for example, an inverse discrete Fourier transform on the symbols in the respective streams. The resultant symbols may then be provided to an analog and RF block for transmission. In some implementations, to ensure a uniform average transmission power, the analog and RF block may apply a power scaling factor to the modulated symbols 734 in block 608 prior to transmission over the wireless channel based on an amount of amplitude shaping performed in the first encoding operation.

In some implementations, the wireless communication device may, in the same wireless packet that includes the modulated symbols 734, also transmit an indication of the first encoding operation to the receiving device in block 608. For example, the wireless communication device may transmit the indication in a preamble of the wireless packet such as in a signaling field (for example, in an EHT-SIG field). In some such implementations, the wireless communication device may transmit an MCS field (which may be in an EHT-SIG) in the preamble of the packet that indicates a coding rate (for example, an LDPC coding rate) used in performing the second encoding operation in block 604, a modulation (for example, QAM) constellation size, and one or more indications of the first encoding operation. In some other implementations, the one or more indications of the first encoding operation may be transmitted in a second signaling field separate from the MCS field (for example, in another subfield within EHT-SIG). In some implementations, the MCS field or the second signaling field also includes an indication of the power scaling factor applied to the modulated symbols in block 608. In some implementations, the MCS field or the second signaling field may further indicate a size of the code block (or indications of the sizes and numbers of code blocks for a group of code blocks) input to the shaping encoder 710 on which the first encoding operation was performed in block 602. In some other implementations, one or both of the power scaling factor and the code block size may be signaled implicitly.

To indicate the first encoding operation, the MCS field or the second signaling field may include a first bit indicating whether the first encoding operation was performed and one or more second bits indicating one or more amplitude shaping parameters associated with the first encoding operation that define the non-uniform distribution of the amplitudes. In other words, the amplitude shaping parameters may define an amount of shaping or a probabilistic shaping rate associated with the amplitudes. For example, the amplitude shaping parameters may include an indication of the probability mass function associated with the first encoding operation for each MCS. In some specific examples, the amplitude shaping parameter may include information related to the sizes and amplitude levels associated with the bins used in an arithmetic encoding operation, or information related to the LUTs used in a prefix encoding operation. As described above, the MCS field or the second signaling field may also include signaling bits.

Figure 8:
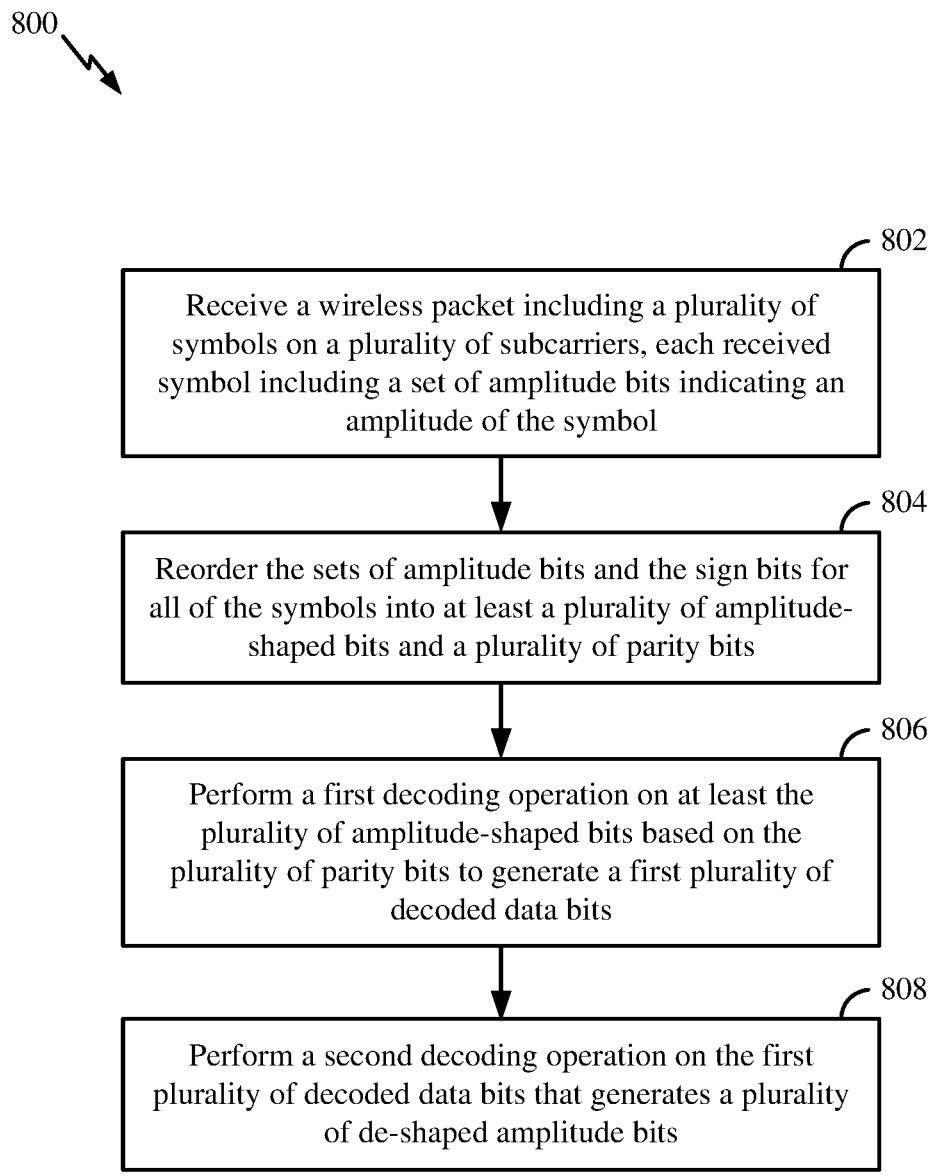
FIG. 8 shows a flowchart illustrating an example process for wireless communication that supports amplitude shaping according to some implementations.

FIG. 8 shows a flowchart illustrating an example process 800 for wireless communication that supports amplitude shaping according to some implementations. The operations of the process 800 may be implemented by a receiving device or its components as described herein. For example, the process 800 may be performed by a wireless communication device such as the wireless communication device 400 described with reference to FIG. 4. In some implementations, the process 800 may be performed by a wireless communication device operating as or within an AP, such as one of the APs 102 and 502 described with reference to FIGS. 1 and 5A, respectively. In some other implementations, the process 800 may be performed by a wireless communication device operating as or within a STA, such as one of the STAs 104 and 504 described with reference to FIGS. 1 and 5B, respectively.

In block 802, the wireless communication device receives a wireless packet including a plurality of modulated symbols on a plurality of subcarriers. Each received symbol includes a set of amplitude bits indicating an amplitude of the symbol. In some implementations, the amplitudes of the demodulated symbols have a non-uniform distribution. Each received symbol further includes at least one sign bit indicating a quadrant in a modulation constellation in which the respective amplitude is located. In block 804, the wireless communication device reorders the sets of amplitude bits and the sign bits for all of the symbols into at least a plurality of amplitude-shaped bits and a plurality of parity bits. In block 806, the wireless communication device performs a first decoding operation on at least the plurality of amplitude-shaped bits based on the plurality of parity bits to generate a first plurality of decoded data bits. In block 808, the wireless communication device performs a second decoding operation on the first plurality of decoded data bits that generates a plurality of de-shaped amplitude bits.

Figure 9A:
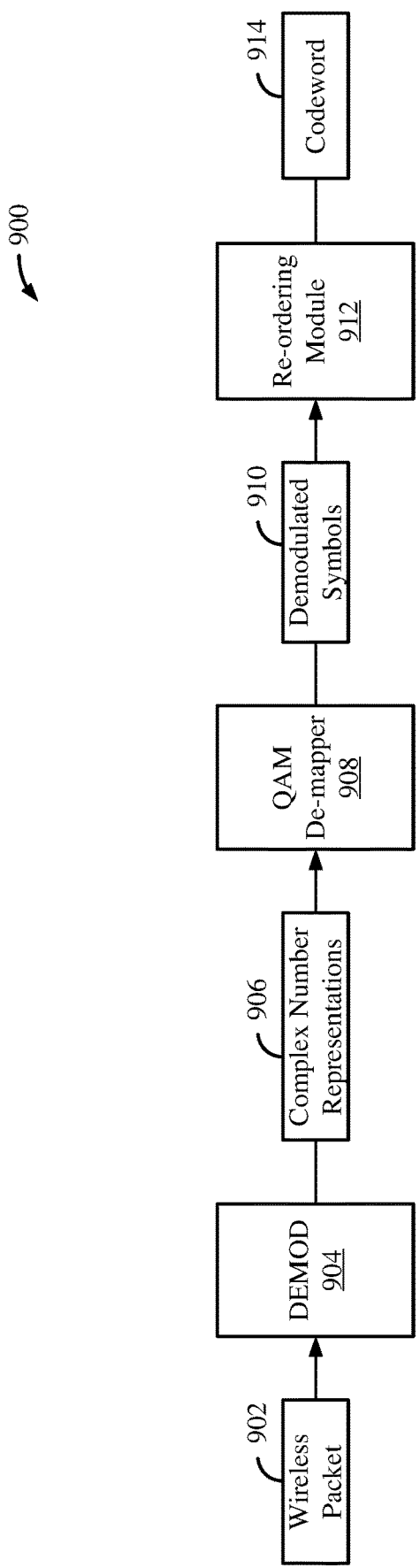
FIGS. 9A and 9B show a diagram of a flow that supports amplitude shaping according to some implementations.
Figure 9B:
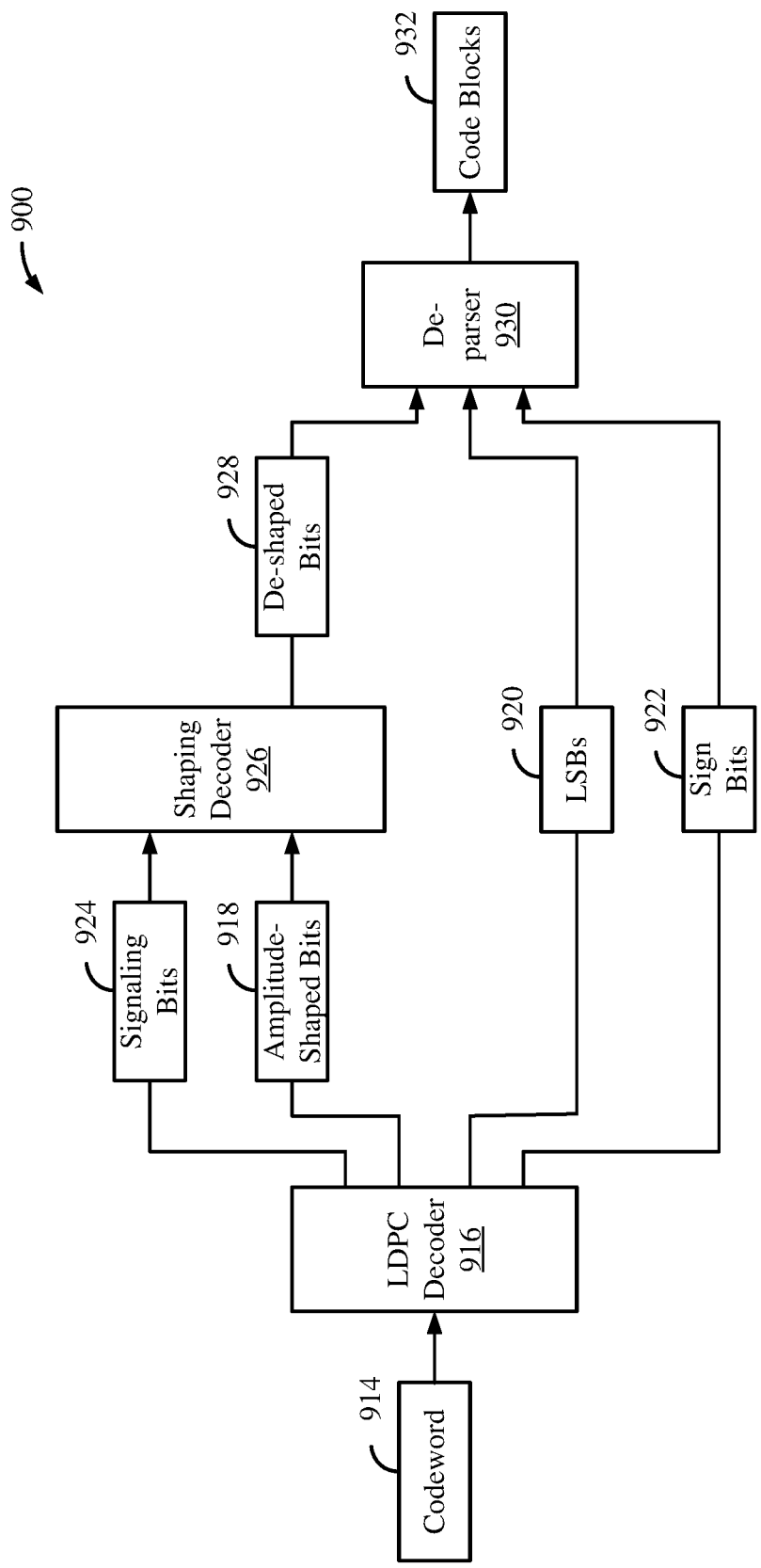

FIGS. 9A and 9B show a diagram of a flow 900 that supports amplitude shaping according to some implementations. For example, the flow 900 may illustrate aspects of the process 800. The process 800 and flow 900 are further presented below in relation to the process 600 and flow 700 described with reference to FIGS. 6 and 7. For example, in some implementations, the wireless communication device receives, in block 802, a wireless packet 902 including the plurality of modulated symbols 734 that were transmitted from the transmitting wireless communication device in block 608 of the process 600.

In some implementations, a demodulator 904 may receive the modulated symbols 734 via coupled antennas and receive chains and demodulate the subcarriers based on the detected amplitudes and phases in block 802 to generate demodulated symbols in the form of complex number representations 906 indicating the amplitudes and phases of the symbols, which are, ideally, identical to the complex number representations 730. For example, the demodulator 904 may include an analog and RF block that receives the wireless packet 902 and the modulated symbols over a plurality of spatial streams over a plurality of tones in one or more bandwidth segments via one or more coupled antennas. The received symbols may then be provided to a transform block of the demodulator 904 that performs, for example, a discrete Fourier transform on the symbols in the streams. In some implementations, the demodulator 732 further includes a bandwidth segment parser that parses the different bandwidth segment streams. A tone reverse-mapper of the demodulator 732 may then reverse-map the tones to obtain a plurality of spatial streams for each of the bandwidth segments (if present).

A constellation reverse-mapper (for example, a QAM reverse-mapper) 908 may then reverse map the complex number representations 906 from the respective points in the (for example, QAM) modulation constellation to obtain the demodulated symbols 910. For example, continuing the example presented above, the resultant streams of complex number representations 906 may be provided to respective constellation de-mappers that provide respective spatial streams of the demodulated symbols 910. Each of the demodulated symbols 910 ultimately includes a set of n amplitude bits indicating an amplitude of the symbol. As described above in conjunction with the process 600 and flow 700, a first n/2 bits of the set of n amplitude bits for each demodulated symbol 910 may indicate a first amplitude component of the amplitude of the symbol along a real axis of the modulation constellation, and a second n/2 bits of the set of n amplitude bits for each demodulated symbol 910 may indicate a second amplitude component of the amplitude of the symbol along an imaginary axis of the modulation constellation. As such, there are $2^{n/2}$ possible first amplitude levels for the first (real) amplitude component and $2^{n/2}$ possible second amplitude levels for the second (imaginary) amplitude component of each demodulated symbol 910. As described above, each of the demodulated symbols 910 may further include a sign bit for each of the amplitude components that indicates the sign of the respective amplitude.

As described above, in block 804, the wireless communication device reorders the sets of amplitude bits and the sign bits for all of the symbols into at least a plurality of amplitude-shaped bits and a plurality of parity bits. For example, the amplitude-shaped bits may include the MSBs 706a. In some such examples, the sets of amplitude bits may further include a plurality of unshaped bits, for example, including the LSBs 708. In some implementations, the demodulated symbols 910 may further include a plurality of sign bits or signaling bits. In some implementations, a reordering module 912 may receive the demodulated symbols 910 including all of the amplitude bits (including the amplitude-shaped bits and any unshaped bits) and the parity bits and reassemble them into a codeword 914. For example, continuing the example presented above, the reordering module 912 may also include a plurality of bandwidth segment deparsers that deparse the symbols 910 from the respective bandwidth segment streams. In some implementations, the reordering module 912 also may include a spatial stream deparser that deparses the symbols in the resultant spatial streams into a single stream of bits. As described above, the reordering module 912 may then reorder the bits from the demodulated symbols into the codeword 914.

As described above, in block 806, the wireless communication device performs a first decoding operation on at least the plurality of amplitude-shaped bits based on the plurality of parity bits to generate a first plurality of decoded data bits. For example, as shown in FIG. 9B, a first decoder 916 may receive the codeword 914 and perform the first decoding operation on the codeword 914 in block 808 to provide at least a first plurality of decoded data bits based on the amplitude-shaped bits. The first decoder 916 may be a systematic decoder (for example, an LDPC decoder) that attempts to decode the amplitude bits with the aid of the parity bits. As described above, the codeword 914 may also include unshaped amplitude bits (for example, LSBs or sign bits). As such, based on the decoding of the codeword 914, the first decoder 916 may output a decoded code block including decoded amplitude-shaped bits (for example, MSBs) 918, decoded LSBs 920, decoded sign bits 922 and decoded signaling bits 924.

As described above, the wireless communication device performs a second decoding operation in block 808 on the amplitude-shaped bits 918 to generate de-shaped amplitude bits. In some implementations, a shaping decoder 926 performs the second decoding operation (also referred to herein as the "amplitude de-shaping operation") to remove redundancy from the amplitude-shaped bits 918 to generate the de-shaped amplitude bits 928 such that the number (numerical quantity) of de-shaped amplitude bits 928 is less than the number of amplitude-shaped bits 918. In some implementations in which the plurality of decoded data bits includes unshaped bits (for examples, LSBs 920, sign bits 922 or signaling bits 924), the second decoding operation is performed on only the amplitude-shaped bits 918 in block 808. The amplitude de-shaping operation undoes the corresponding amplitude-shaping operation that was performed at the transmitting device such that the amplitudes associated with the respective symbols are reverted to a substantially uniform distribution.

In some implementations, the second decoding operation performed in block 808 is or includes an arithmetic decoding operation. For example, the shaping decoder 926 may perform an arithmetic decoding operation in block 808 that is essentially the inverse of the arithmetic encoding operation described with reference to block 602 of the process 600. In some other implementations, the second decoding operation performed in block 808 is or includes a prefix decoding operation. For example, the shaping decoder 926 may perform a prefix decoding operation in block 808 that is essentially the inverse of the prefix encoding operation described with reference to block 602 of the process 600. As described above, in some implementations, the performance of the prefix decoding operation can be parallelized.

In the illustrated example, a deparser 930 reassembles the de-shaped bits (for example, the MSBs) 928 and any LSBs 920 or sign bits 922 into one or more information blocks 932. The information blocks 932 may then be processed by the MAC layer of the wireless communication device to decode corresponding MPDUs.

Figure 10A:
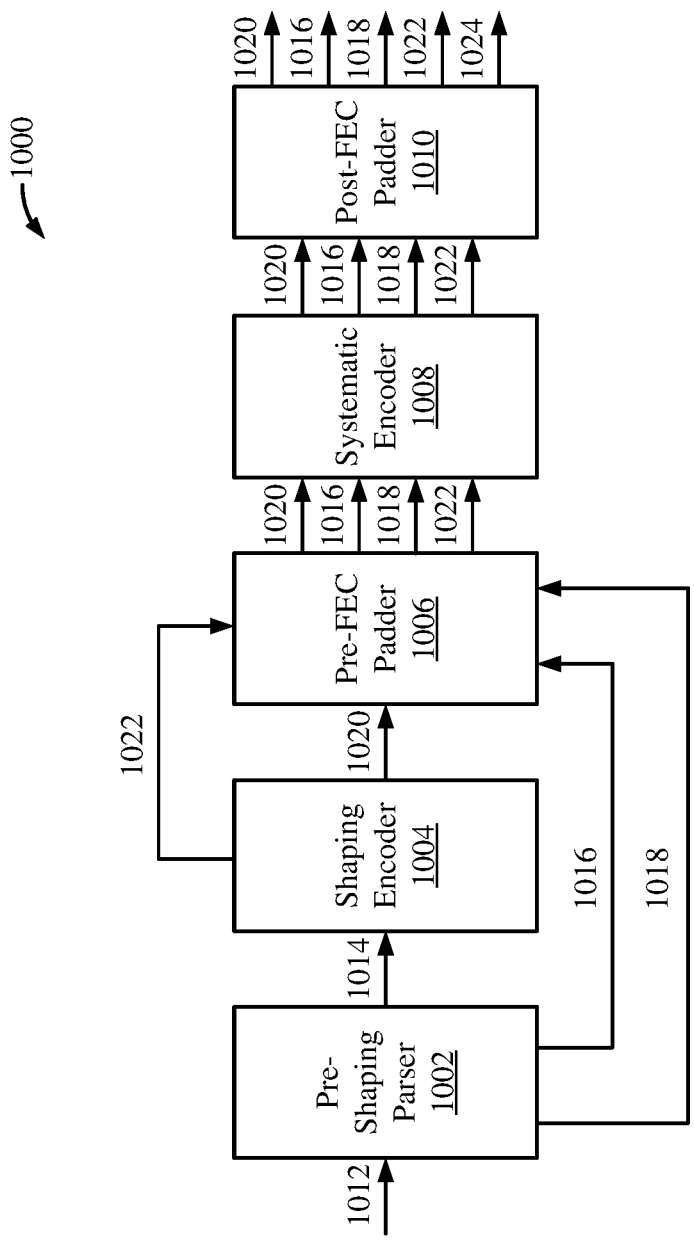
FIG. 10A shows an example wireless communication device that supports amplitude shaping according to some implementations.

In some implementations, amplitude-shaping encoding operations and amplitude de-shaping decoding operations may be implemented by MAC layers of the transmitting and receiving devices, respectively. For example, FIG. 10A shows an example wireless communication device 1000 that supports amplitude shaping according to some implementations. The wireless communication device 1000 includes a pre-shaping parser 1002, a shaping encoder 1004, a pre-forward-error-correction (pre-FEC) PHY padder 1006, a systematic encoder 1008, and a post-FEC PHY padder 1010. In the illustrated example, the pre-shaping parser 1002 and the shaping encoder 1004 are implemented by the MAC layer of the transmitting device. The pre-FEC PHY padder 1006, the systematic encoder 1008 and the post-FEC PHY padder 1010 may be implemented by the PHY layer of the transmitting device.

The pre-shaping parser 1002 receives an information block 1012. For example, the pre-shaping parser 1002 may receive the information block 1012 in the form of an A-MPDU that includes a plurality of MPDUs. In some implementations, the pre-shaping parser 1002 may implement aspects of the pre-shaping parser 704 described with reference to FIG. 7A. As described above, each MPDU includes a plurality of data bits including a plurality of information bits (payload bits) as well as a plurality of control bits or a plurality of signaling bits. For example, the information bits in each MPDU may be, or may include, a plurality of bits (amplitude bits) to be used for determining the amplitudes of the symbols. The data bits in each MPDU may also include a plurality of bits (sign bits) to be used for determining the respective quadrants the amplitudes of the symbols are located in in the modulation constellation. In some implementations, the sign bits or LSBs of the amplitude bits include control bits or signaling bits representative of portions of the MPDUs that contain control information or MAC signaling information. For example, the control bits or signaling bits may include the bits that convey the MPDU delimiters, MPDU headers, frame check sequences (FCSs) and padding bits in each MPDU, or the MAC destination addresses, MAC source addresses, lengths and padding bits in the MSDUs within the MPDUs.

The pre-shaping parser 1002 may parse the bits in the information block 1012 into bits that are to be shaped by the shaping encoder 1004 and bits that are not to be shaped by the shaping encoder 1004. For example, the pre-shaping parser 1002 may separate or divide the bits in the information block 1012 into MSBs 1014, LSBs 1016 and sign bits 1018. In some implementations, the amplitude-shaping encoding operation is only performed on the MSBs 1014 and not performed on the LSBs 1016 or the sign bits 1018, for example, because the sign bits do not affect the resultant transmit power and the LSBs may have relatively less of an effect on the transmit power. In some implementations, the amplitude-shaping encoding operation is not performed on other information bits, the control bits or the signaling bits, for example, to preserve the control or signaling information and to facilitate decoding by the receiving device.

In some implementations, the number $N_{shaped}$ of bits to be parsed and input to the shaping encoder 1004 for amplitude-shaping encoding may be calculated according to Equation (3) below.

$$N_{shaped} = \frac{8 * \text{APEP\_LENGTH} + N_{tail} + N_{service} + N_{PAD,Pre-FEC}}{\frac{R_{LDPC} N_{bpscs} - 2 * N_{MSB}}{R_{shaper} * 2 * N_{MSB}} + 1}$$

In Equation (3), $N_{tail}$ is the number of tail bits added by the MAC layer (which may be zero in implementations that employ LDPC encoding for the second encoding operation), $N_{service}$ is the number of service bits added by the MAC layer, $N_{PAD,pre-FEC}$ is the number of padding bits added by the MAC layer, $R_{LDPC}$ is the coding rate of the second encoder (for example, an LDPC encoder), $N_{bpscs}$ is the number of bits per subcarrier per stream, $N_{MSB}$ is the number of MSBs used for each of the real and imaginary components of the amplitudes, $R_{shaper}$ is the coding rate of the shaping encoder, and APEP_LENGTH is the initial payload length calculated by the MAC layer. In some implementations, $N_{PAD,pre-FEC}$ is assumed to be zero in an initial determination of $N_{shaped}$ to calculate the number of pre-FEC padding bits to be added.

As described above, in the illustrated example, only the MSBs 1014 are provided to the shaping encoder 1004 for the performance of the amplitude-shaping encoding operation. The shaping encoder 1006 performs the amplitude-shaping encoding operation on the MSBs 1014 to generate amplitude-shaped bits 1020. In some implementations, the shaping encoder 1004 may implement aspects of the shaping encoder 710 described with reference to FIG. 7A. As described above, in some implementations, the shaping encoder 1004 adds redundancy to the MSBs 1014 to generate the amplitude-shaped bits 1020 such that the amplitude-shaped bits 1020 include more bits than the MSBs 1014 input to the shaping encoder 1004. By adding redundancy, the shaping encoder 1004 may encode the MSBs 1014 to generate the amplitude-shaped bits 1020 such that the amplitudes of the associated symbols have a non-uniform distribution, and specifically, a distribution in which the probabilities associated with the respective amplitudes generally increase with decreasing amplitude, such as a Gaussian distribution.

The number of amplitude-shaped bits output from the shaping encoder 1004 may be given by Equation (4) below.

$$\text{Number of output bits} = \frac{N_{shaped}}{R_{shaper}} + N_{signaling}$$

In Equation (4), $N_{signaling}$ is the number of signaling bits output from the shaping encoder. For example, in some implementations, the pre-shaping parser 1002 or other module of the MAC layer also generates signaling bits that are then provided to the PHY layer with the MSBs 1014, the LSBs 1016 and the sign bits 1018 to inform the PHY layer how the bits in the information block 1012 were parsed. For example, this enables the PHY layer to properly arrange the bits into symbols and perform constellation mapping as described below.

As described above, in some implementations, the amplitude-shaping encoding operation is or includes an arithmetic encoding operation. For example, the shaping encoder 1004 may be configured to perform an arithmetic encoding operation such as the arithmetic encoding operation described with reference to block 602 of the process 600 of FIG. 6 and the flow 700 of FIG. 7A. In some other implementations, the amplitude-shaping encoding operation is or includes a prefix encoding operation. For example, the shaping encoder 1004 may be configured to perform a prefix encoding operation such as the prefix encoding operation described with reference to block 602 of the process 600 of FIG. 6 and the flow 700 of FIG. 7A. As described above, the shaping encoder 1004 may output signaling bits 1022 indicating the amplitude-shaping encoding operation that was performed, including signaling bits indicating amplitude-shaping encoding parameters that define the non-uniform distribution of the amplitudes or a scrambling sequence or scrambling operation used for the amplitude-shaping encoding operation. The signaling bits indicating the parameters may ultimately be encoded and transmitted to the receiving device in, for example, an MCS field or another field (such as an EHT-SIG) in a preamble of the wireless packet that will contain the symbols.

The MAC layer may then pass the amplitude-shaped bits 1020, the LSBs 1016, the sign bits 1018 and the signaling bits 1022 to the PHY layer of the transmitting device. For example, the pre-FEC PHY padder 1006 may receive one or more information blocks in the form of a PSDU that includes the amplitude-shaped bits 1020, the LSBs 1016, the sign bits 1018 and the signaling bits 1022. The pre-FEC PHY padder 1006 then adds padding bits. Because physical layer wireless communications are transmitted as modulated symbols, the lengths of physical layer wireless transmissions are quantized in units of symbols. As such, the pre-FEC PHY padder 1006 adds pre-FEC padding bits prior to the provision of the amplitude-shaped bits 1020, the LSBs 1016, the sign bits 1018 and the signaling bits 1022 to the systematic encoder 1008 for systematic encoding to ensure that the systematic encoder receives the proper number of bits to produce an integer number of symbols. In some instances, the pre-FEC padding bits may themselves be used as amplitude bits or sign bits. For example, the pre-FEC padding bits may be subsequently included in the sign bits 1018.

The systematic encoder 1008 receives the amplitude-shaped bits 1020, the LSBs 1016, the sign bits 1018 and the signaling bits 1022, and performs a systematic encoding operation on the bits to generate a codeword. In some implementations, the systematic encoder 1008 may implement aspects of the systematic encoder 716 described with reference to FIG. 7A. As described above, in some implementations, the performance of the systematic encoding operation encodes the amplitude-shaped bits 1020, the LSBs 1016, the sign bits 1018 and the signaling bits 1020 such that the codeword output from the systematic encoder 1008 also includes the amplitude-shaped bits 1020, the LSBs 1016, the sign bits 1018 and the signaling bits 1022 input to the systematic encoder. For example, in some such implementations, the systematic encoding operation is or includes an LDPC encoding operation. As described above, the performance of the systematic encoding operation adds redundancy to the data, for example, by generating a plurality of parity bits based on the amplitude-shaped bits 1020, the LSBs 1016, the sign bits 1018 and the signaling bits 1022. As is also described above, the parity bits may themselves be used as sign bits, and as such, may hereinafter also be included in the sign bits 1018.

The post-FEC PHY padder 1010 receives the codeword including the amplitude-shaped bits 1020, the LSBs 1016, the sign bits 1018 and the signaling bits 1022 and, for example, based on packet extension requirements, adds post-FEC padding bits 1024 to the codeword to satisfy the packet extension requirements. The amplitude-shaped bits 1020, the LSBs 1016, the sign bits 1018, the signaling bits 1022, and the post-FEC padding bits 1024 may then be arranged into a plurality of symbols as described with reference to block 606 of the process 600 of FIG. 6. For example, the amplitude-shaped bits 1020, the LSBs 1016, the sign bits 1018, the signaling bits 1022, and the post-FEC padding bits 1024 may be provided to an ordering module. In some implementations, the ordering module may implement aspects of the ordering module 724 described with reference to FIG. 7B.

As described above, in some implementations, the ordering module may include a spatial stream parser that parses the amplitude-shaped bits 1020, the LSBs 1016, the sign bits 1018, the signaling bits 1022, and the post-FEC padding bits 1024 into a plurality of spatial streams of symbols. In some such implementations, the spatial stream parser parses the amplitude-shaped bits 1020, the LSBs 1016, the sign bits 1018, the signaling bits 1022, and the post-FEC padding bits 1024 separately for each of the spatial streams to ensure that the bits are properly arranged into the symbols in the different spatial streams. In some implementations, the ordering module additionally includes a plurality of bandwidth segment parsers that parse the symbols from the spatial streams into different bandwidth segments.

The symbols may then be transmitted on a plurality of subcarriers to at least one receiving device in a wireless packet. For example, after spatial stream parsing and bandwidth segment parsing (if performed), each of the different streams of parsed symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B, including a plurality of tone mappers, a bandwidth segment deparser, a spatial multiplexer, a transform block, and an analog and RF block.

In some implementations, the wireless communication device 1000 includes corresponding functionality for receiving and decoding modulated symbols. For example, the wireless communication device 1000 may include a post-FEC padding removal module, a systematic decoder, a pre-FEC padding removal module, a shaping decoder, and a post-deshaping deparser. In some such implementations, the shaping decoder and the post-de-shaping deparser are implemented by the MAC layer of the transmitting device. The post-FEC padding removal module, the systematic decoder, and the pre-FEC padding removal module may be implemented by the PHY layer of the transmitting device. In some implementations, the shaping decoder may implement aspects of the shaping decoder 926 described with reference to FIG. 9B. In some such implementations, the post-de-shaping deparser may implement aspects of the post-de-shaping deparser 930 described with reference to FIG. 9B.

Figure 10B:
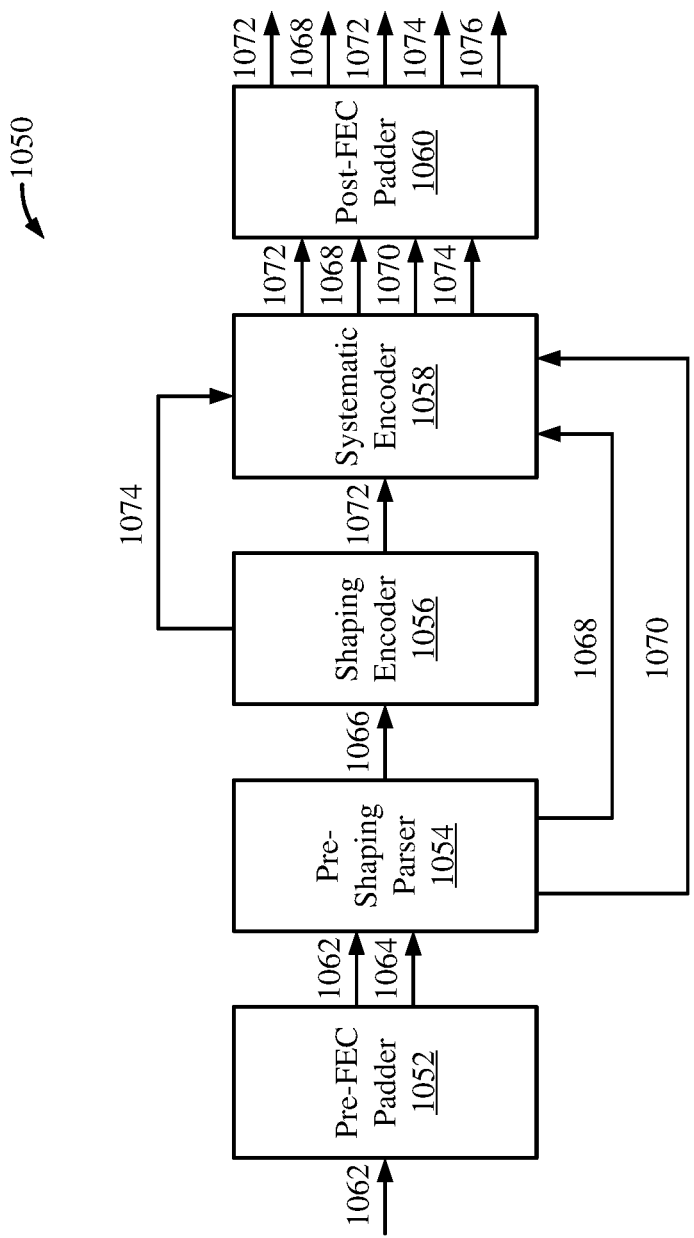
FIG. 10B shows an example wireless communication device that supports amplitude shaping according to some implementations.

In some other implementations, amplitude-shaping encoding operations and amplitude de-shaping decoding operations may be implemented by PHY layers of the transmitting and receiving devices, respectively. For example, FIG. 10B shows an example wireless communication device 1050 that supports amplitude shaping according to some implementations. The wireless communication device 1050 includes a pre-FEC PHY padder 1052, a pre-shaping parser 1054, a shaping encoder 1056, a systematic encoder 1058, and a post-FEC PHY padder 1060. Unlike in the wireless communication device 1000, the pre-shaping parser 1054 and the shaping encoder 1056 are implemented by the PHY layer of the transmitting device. The pre-FEC PHY padder 1052, the systematic encoder 1058 and the post-FEC PHY padder 1060 also may be implemented by the PHY layer of the transmitting device.

The pre-FEC PHY padder 1052 receives an information block 1062 from the MAC layer of the transmitting device. For example, the pre-FEC PHY padder 1052 may receive the information block 1062 in the form of a PSDU that includes information bits for a plurality of MPDUs of an A-MPDU. The pre-FEC PHY padder 1052 adds pre-FEC padding bits 1064 to the information block 1062. As described above, the pre-FEC PHY padder 1052 may add the pre-FEC padding bits 1064 prior to the amplitude-shaping encoding operation to ensure that the shaping encoder 1056 receives enough bits to produce an integer number of symbols.

The information block 1062 and the pre-FEC padding bits 1064 are then provided to the pre-shaping parser 1054. In some implementations, the pre-shaping parser 1054 may implement aspects of the pre-shaping parser 704 described with reference to FIG. 7A. The pre-shaping parser 1054 may parse the bits in the information block 1062 into bits that are to be shaped by the shaping encoder 1056 and bits that are not to be shaped by the shaping encoder 1056. For example, the pre-shaping parser 1054 may separate or divide the bits in the information block 1062 into MSBs 1066, LSBs 1068 and sign bits 1070. In some instances, the pre-FEC padding bits 1064 may themselves be used as amplitude bits or sign bits. For example, the pre-FEC padding bits may be subsequently included in the sign bits 1070.

In some implementations, the amplitude-shaping encoding operation is only performed on the MSBs 1066 and not performed on the LSBs 1068 or the sign bits 1070, for example, because the sign bits do not affect the resultant transmit power and the LSBs may have relatively less of an effect on the transmit power. In some implementations, the amplitude-shaping encoding operation is not performed on other information bits, the control bits or the signaling bits, for example, to preserve the control or signaling information and to facilitate decoding by the receiving device.

In some implementations, the number $N_{shaped}$ of bits to be parsed and input to the shaping encoder 1056 for amplitude-shaping encoding may be calculated according to Equation (3) above. As described above, the pre-shaping parser 1054 or other module of the PHY layer may also generate signaling bits that that indicate how the bits in the information block 1012 were parsed. The signaling bits indicating how the bits in the information block were parsed may ultimately be encoded and transmitted to the receiving device in, for example, an MCS field or another field (such as an EHT-SIG) in a preamble of the wireless packet that will contain the symbols.

As described above, in the illustrated example, the amplitude-shaping encoding operation is only performed on the MSBs 1066. The shaping encoder 1056 performs the amplitude-shaping encoding operation on the MSBs 1066 to generate amplitude-shaped bits 1072. In some implementations, the shaping encoder 1056 may implement aspects of the shaping encoder 710 described with reference to FIG. 7A. As described above, in some implementations, the shaping encoder 1056 adds redundancy to the MSBs 1066 to generate the amplitude-shaped bits 1072 such that the amplitude-shaped bits 1072 include more bits than the MSBs 1066 input to the shaping encoder 1056. By adding redundancy, the shaping encoder 1056 may encode the MSBs 1066 to generate the amplitude-shaped bits 1072 such that the amplitudes of the associated symbols have a non-uniform distribution, and specifically, a distribution in which the probabilities associated with the respective amplitudes generally increase with decreasing amplitude, such as a Gaussian distribution. In some implementations, the number of amplitude-shaped bits output from the shaping encoder 1056 may be given by Equation (4) above.

As described above, in some implementations, the amplitude-shaping encoding operation is or includes an arithmetic encoding operation. For example, the shaping encoder 1056 may be configured to perform an arithmetic encoding operation such as the arithmetic encoding operation described with reference to block 602 of the process 600 of FIG. 6 and the flow 700 of FIG. 7A. In some other implementations, the amplitude-shaping encoding operation is or includes a prefix encoding operation. For example, the shaping encoder 1056 may be configured to perform a prefix encoding operation such as the prefix encoding operation described with reference to block 602 of the process 600 of FIG. 6 and the flow 700 of FIG. 7A. As described above, the shaping encoder 1056 may output signaling bits 1074 indicating the amplitude-shaping encoding operation that was performed, including signaling bits indicating amplitude-shaping encoding parameters that define the non-uniform distribution of the amplitudes or a scrambling sequence or scrambling operation used for the amplitude-shaping encoding operation. The signaling bits indicating the parameters may ultimately be encoded and transmitted to the receiving device in, for example, an MCS field or another field (such as an EHT-SIG) in a preamble of the wireless packet that will contain the symbols.

The systematic encoder 1058 receives the amplitude-shaped bits 1072, the LSBs 1068, the sign bits 1070 and the signaling bits 1074, and performs a systematic encoding operation on the bits to generate a codeword. In some implementations, the systematic encoder 1058 may implement aspects of the systematic encoder 716 described with reference to FIG. 7A. As described above, in some implementations, the performance of the systematic encoding operation encodes the amplitude-shaped bits 1072, the LSBs 1068, the sign bits 1070 and the signaling bits 1074 such that the codeword output from the systematic encoder 1058 also includes the amplitude-shaped bits 1072, the LSBs 1068, the sign bits 1070 and the signaling bits 1074 input to the systematic encoder. For example, in some such implementations, the systematic encoding operation performed is or includes an LDPC encoding operation. As described above, the performance of the systematic encoding operation adds redundancy to the data, for example, by generating a plurality of parity bits based on the amplitude-shaped bits 1072, the LSBs 1068, the sign bits 1070 and the signaling bits 1074. As is also described above, the parity bits may themselves be used as sign bits, and as such, may hereinafter also be referred to as sign bits 1070.

The post-FEC PHY padder 1060 receives the codeword including the amplitude-shaped bits 1072, the LSBs 1068, the sign bits 1070 and the signaling bits 1074 and, for example, based on packet extension requirements, adds post-FEC padding bits 1076 to the codeword to satisfy the packet extension requirements. The amplitude-shaped bits 1072, the LSBs 1068, the sign bits 1070, the signaling bits 1074, and the post-FEC padding bits 1076 may then be arranged into a plurality of symbols as described with reference to block 606 of the process 600 of FIG. 6. For example, the amplitude-shaped bits 1072, the LSBs 1068, the sign bits 1070, the signaling bits 1074, and the post-FEC padding bits 1076 may be provided to an ordering module. In some implementations, the ordering module may implement aspects of the ordering module 724 described with reference to FIG. 7B.

As described above, in some implementations, the ordering module may include a spatial stream parser that parses the amplitude-shaped bits 1072, the LSBs 1068, the sign bits 1070, the signaling bits 1074, and the post-FEC padding bits 1076 into a plurality of spatial streams of symbols. In some such implementations, the spatial stream parser parses the amplitude-shaped bits 1072, the LSBs 1068, the sign bits 1070, the signaling bits 1074, and the post-FEC padding bits 1076 separately for each of the spatial streams to ensure that the bits are properly arranged into the symbols in the different spatial streams. In some implementations, the ordering module additionally includes a plurality of bandwidth segment parsers that parse the symbols from the spatial streams into different bandwidth segments.

The symbols may then be transmitted on a plurality of subcarriers to at least one receiving device in a wireless packet. For example, after spatial stream parsing and bandwidth segment parsing (if performed), each of the different streams of parsed symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B, including a plurality of tone mappers, a bandwidth segment deparser, a spatial multiplexer, a transform block, and an analog and RF block.

In some implementations, the wireless communication device 1050 includes corresponding functionality for receiving and decoding modulated symbols. For example, the wireless communication device 1050 may include a post-FEC padding removal module, a systematic decoder, a shaping decoder, a post-deshaping deparser, and a pre-FEC padding removal module. In some such implementations, the shaping decoder and the post-de-shaping deparser are implemented by the PHY layer of the transmitting device. The post-FEC padding removal module, the systematic decoder, and the pre-FEC padding removal module also are implemented by the PHY layer of the transmitting device. In some implementations, the shaping decoder may implement aspects of the shaping decoder 926 described with reference to FIG. 9B. In some such implementations, the post-de-shaping deparser may implement aspects of the post-de-shaping deparser 930 described with reference to FIG. 9B.

As described above, because the number of amplitude-shaped bits output from the shaping encoder may be content dependent, the effective coding rate of the shaping encoder may be intrinsically variable. Without a fixed coding rate, the boundaries between the MPDUs in the A-MPDU may be lost. As described above, from the MAC layer perspective, wireless communications are transmitted as frames including MPDUs, and the lengths of the MPDUs are quantized in units of bytes. For example, the MAC layer may package the payload bits in the MPDUs in integer multiples of bytes, such as integer multiples of 4-byte segments. The MAC layer of the receiving device may identify and track the boundaries between the MPDUs based on decoding the MAC delimiters associated with respective MPDUs. In instances in which the decoding of an MPDU delimiter fails, the MAC layer may scan the other MPDU boundaries to find the next MPDU boundary. In conventional systems, if an MPDU is corrupted or otherwise not decoded successfully, the corruption does not affect the remaining MPDUs, and thus, the remaining MPDUs may still be decoded successfully by the receiving device. However, in implementations that employ amplitude-shaping encoding, because the length of the de-shaped bits at the receiving device may be unknown, if an MPDU is corrupted, the receiving device may not be able to track and identify the MPDU boundaries after the corrupted MPDU.

Figure 11:
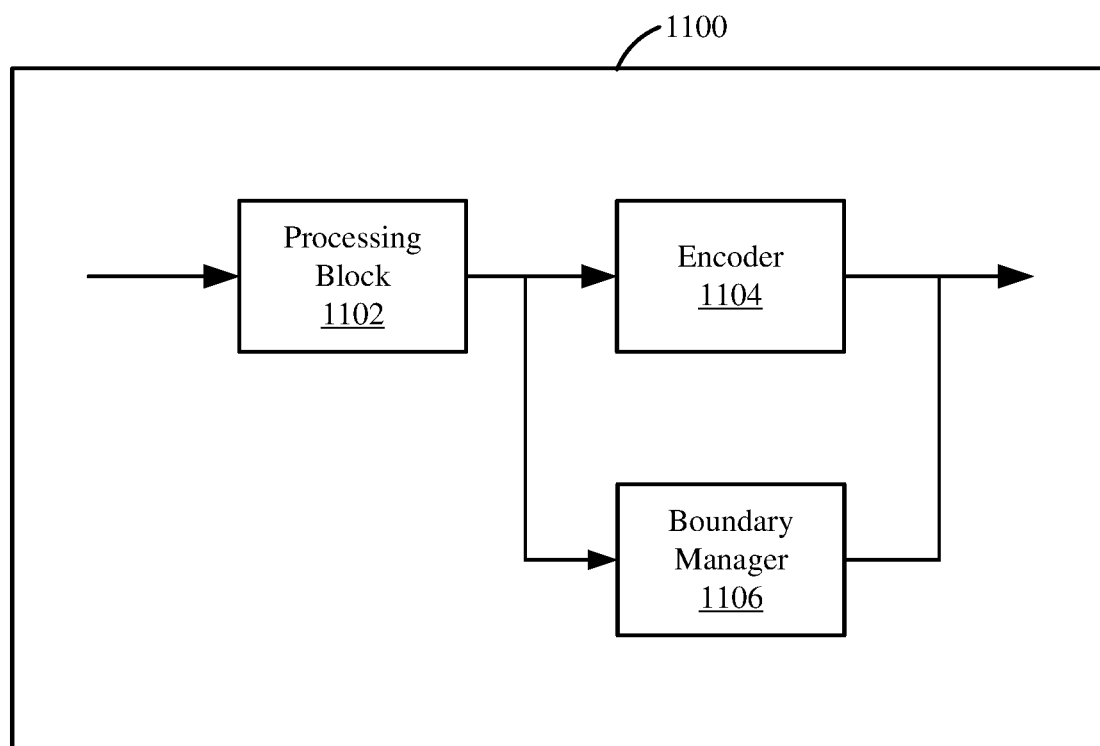
FIG. 11 shows an example wireless communication device that supports boundary identification for prefix encoding according to some implementations.

FIG. 11 shows an example wireless communication device 1100 that supports boundary identification for prefix encoding according to some implementations. The wireless communication device 1100 includes a processing block 1102, an encoder 1104 and a boundary manager 1106. In some implementations, the processing block 1102 is implemented at least in part by a processor, such as the processor 404 described with reference to FIG. 4, which may implement a MAC layer. The processing block 1102 may also be implemented at least in part by a modem, such as the modem 402 described with reference to FIG. 4. In some implementations, the encoder 1104 may be implemented at least in part by a PHY layer implemented by the modem. In some implementations, the encoder 1104 is or includes a prefix encoder. For example, the encoder 1104 may implement aspects of the shaping encoders 710 and 1056 described with reference to FIGS. 7A and 10B, respectively. In some such implementations, the wireless communication device 1100 may further include a pre-FEC padder (such as the pre-FEC padder 1052), a pre-shaping parser (such as the pre-shaping parser 1054), a systematic encoder (such as the systematic encoder 1058), and a post-FEC padder (such as the post-FEC padder 1060). In some implementations, the processing block 1102 includes the pre-FEC padder and the pre-shaping parser. The boundary manager 1106 may be coupled with the processing block 1102 and the encoder 1104, and may also be implemented at least in part by the modem. In some other implementations, the boundary manager 1106 may be implemented at least in part by the encoder 1104 itself.

Figure 12:
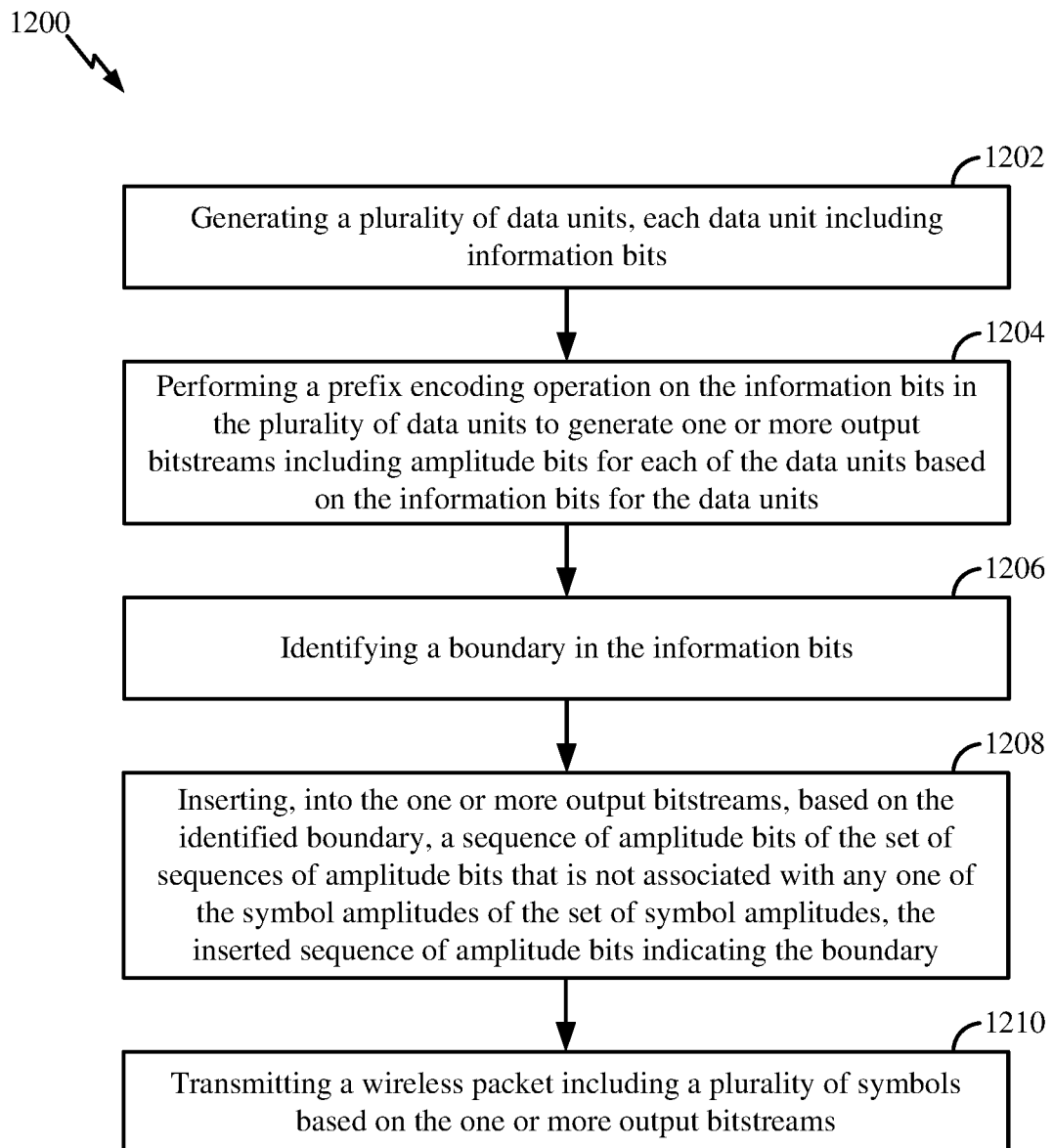
FIG. 12 shows a flowchart illustrating an example process for wireless communication that supports boundary identification for prefix encoding according to some implementations.

FIG. 12 shows a flowchart illustrating an example process 1200 for wireless communication that supports boundary identification for prefix encoding according to some implementations. The operations of the process 1200 may be implemented by a transmitting device or its components as described herein. For example, the process 1200 may be performed at least in part by a wireless communication device such as the wireless communication device 1100 described with reference to FIG. 11. In some implementations, the process 1200 may be performed by a wireless communication device operating as or within an AP, such as one of the APs 102 and 502 described with reference to FIGS. 1 and 5A, respectively. In some other implementations, the process 1200 may be performed by a wireless communication device operating as or within a STA, such as one of the STAs 104 and 504 described with reference to FIGS. 1 and 5B, respectively.

In block 1202, the processing block 1102 generates a plurality of data units, each data unit including information bits. For example, each of the data units may be an MPDU of an A-MPDU to be transmitted in a wireless packet to one or more receiving wireless communication devices. In block 1204, the encoder 1104 performs an encoding operation, and in particular, a prefix encoding operation, on the information bits in the plurality of data units that generates one or more output bitstreams including amplitude bits for each of the data units based on the information bits for the data units. As described above, the performance of the prefix encoding operation may include comparing sequences of consecutive bits of the information bits to one or more patterns of bit values of a set of patterns of bit values having non-uniform lengths. As described above, the patterns of bit values may be defined such that each of the patterns of bit values has an associated probability of occurrence in the information bits based in part on its length, and specifically, such that the patterns of bit values associated with relatively lower symbol amplitudes have relatively higher probabilities of occurrence than the patterns of bit values associated with relatively higher symbol amplitudes.

In some implementations configured for 4096 QAM, there may be up to thirty-two possible sequences of information bits that may be input into the encoder for the prefix encoding operation. For example, as shown in Table 1, there are thirty possible patterns of bit values for the information bits input into the encoder 1104. Each pattern of bit values of the set of patterns of bit values is associated with a respective sequence of amplitude bits of a corresponding set of sequences of amplitude bits. Each sequence of amplitude bits may be different than all of the other sequences of amplitude bits of the set of sequences of amplitude bits such that each sequence of amplitude bits is associated with a single pattern of bit values associated with a corresponding sequence of information bits. However, each sequence of amplitude bits may have a same length as all of the other sets of sequences of amplitude bits. For example, when configured for 4096 QAM, each sequence of amplitude bits may consist of five bit values representing the magnitude of either the in-phase (I) component or the quadrature (Q) component of the amplitude of an associated symbol. As further shown in Table 1, each of most of the sequences of amplitude bits is associated with a respective symbol amplitude of a set of symbol amplitudes that is different than all of the other symbol amplitudes of the set of symbol amplitudes. For example, there are thirty-two different possible sequences of amplitude bits and associated amplitude level values ranging from 1 to 63 (odd numbers only).

TABLE 1

| Input Sequence of Information Bits | Output Sequence of Amplitude Bits | Amplitude | Probability |
|---|---|---|---|
| 0000 | 01111 | 1 | 1/16 |
| 0001 | 01110 | 3 | 1/16 |
| 0010 | 01100 | 5 | 1/16 |
| 0011 | 01101 | 7 | 1/16 |
| 0100 | 01001 | 9 | 1/16 |
| 0101 | 01000 | 11 | 1/16 |
| 0110 | 01010 | 13 | 1/16 |
| 0111 | 01011 | 15 | 1/16 |
| 1000 | 00011 | 17 | 1/16 |
| 1001 | 00010 | 19 | 1/16 |
| 10100 | 00000 | 21 | 1/32 |
| 10101 | 00001 | 23 | 1/32 |
| 10110 | 00101 | 25 | 1/32 |
| 10111 | 00100 | 27 | 1/32 |
| 11000 | 00110 | 29 | 1/32 |
| 11001 | 00111 | 31 | 1/32 |
| 11010 | 10111 | 33 | 1/32 |
| 11011 | 10110 | 35 | 1/32 |
| 111000 | 10100 | 37 | 1/64 |
| 111001 | 10101 | 39 | 1/64 |
| 111010 | 10001 | 41 | 1/64 |
| 111011 | 10000 | 43 | 1/64 |
| 111100 | 10010 | 45 | 1/64 |
| 111101 | 10011 | 47 | 1/64 |
| 1111100 | 11011 | 49 | 1/128 |
| 1111101 | 11010 | 51 | 1/128 |
| 1111110 | 11000 | 53 | 1/128 |
| 11111110 | 11001 | 55 | 1/256 |
| 111111110 | 11101 | 57 | 1/512 |
| 111111111 | 11100 | 59 | 1/512 |
| — | 11110 | 61 | 0 |
| — | 11111 | 63 | 0 |

As described above with reference to the process 600 of FIG. 6, the performance of the prefix encoding operation in block 1204 includes identifying patterns of bit values of the set of patterns of bit values that match a sequence of consecutive bits of the information bits. After matching a sequence of information bits to one of the patterns of bit values, the encoder 1104 may then insert, into one or more output bitstreams, a sequence of amplitude bits that is associated with the pattern of bit values. For example, suppose that the next four information bits to be encoded by the encoder 1104 are 0110. Based on this sequence of information bits, the encoder 1104 may identify the pattern 0110 in a LUT that includes the set of patterns of bit values. For example, the LUT may implement Table 1. The encoder 1104 may then map the pattern 0110 to the corresponding sequence of amplitude bits having the pattern 01010, which as an associated amplitude level of 13, and then insert these amplitude bits into an output bitstream.

Depending on the LUT used for the prefix encoding operation, there may be some sequences of amplitude bits and associated amplitudes that have little or no probability of occurrence in the information bits. For example, because of the defined patterns of bit values, for a LUT implementing Table 1, there is a zero percent probability associated with the patterns 11110 and 11111. For example, the encoder 1104 may always try to map as many consecutive information bits as possible when attempting to identify a pattern of bit values in the LUT. In the example of Table 1, there is a zero percent probability in selecting 11110 because both of the patterns 111100 and 111101 are present in the LUT. Similarly, there is a zero percent probability in selecting 11111 because of the other longer patterns of bit values present in the LUT. As such, the set of patterns of bit values that may be mapped to sequences of information bits may be forced to not include the patterns 11110 and 11111. As such, the number of patterns of bit values in the set of patterns of bit values is less than the number of sequences of amplitude bits in the set of sequences of amplitude bits. For example, in the implementation of Table 1, there are thirty possible patterns of bit values and thirty-two possible sequences of amplitude bits and associated amplitudes.

The process 1200 takes advantage of the unused sequences of amplitude bits, that is, the sequences of amplitude bits that do not correspond to any defined patterns of bit values in the LUT. In particular, the unused sequences of amplitude bits may be used as boundary signatures (and are also referred to herein as "boundary sequences") to indicate boundaries between adjacent data units, blocks or groups of information bits. For example, the process 1200 further includes identifying a boundary in the information bits in block 1206, and inserting, into the one or more output bitstreams in block 1208, based on the identified boundary, one of the boundary sequences. For example, for a LUT implementing Table 1, the boundary manager 1106 may insert one of the sequences 11110 or 11111 into the one or more output bitstreams to indicate the boundary in the information bits to a receiving device. In some implementations, the amplitude bits in the output bitstreams may then be passed to a systematic encoder, such as an LDPC encoder, for the performance of a second (LDPC) encoding operation as described above with reference to the process 600 of FIG. 6. After the performance of blocks 1204, 1206 and 1208 on each of a plurality of data units, blocks or groups of information bits, the wireless communication device may then transmit a wireless packet including a plurality of symbols based on the one or more output bitstreams in block 2210.

In some implementations, the boundary manager 1106 may track boundaries between adjacent MPDUs (or other data units). In some such implementations, the boundary manager 1106 may identify a boundary between a current MPDU and a next adjacent MPDU in block 1206 and insert, into the one or more output bitstreams in block 1208, a boundary sequence between the amplitude bits encoded by the prefix encoding operation for the current MPDU and the amplitude bits encoded, or to be encoded, for a next MPDU.

In some implementations, the performance of the prefix encoding operation in block 1204 may further include determining whether the information bits for the current MPDU are not enough in number to enable the prefix encoder 1104 to complete the generation of one or more remaining sequences of amplitude bits for the MPDU. In some such implementations, the encoder 1104 or the boundary manager 1106 may add padding bits after the information bits in the current MPDU, and further perform the prefix encoding operation on the padding bits in block 1204. For example, the number of padding bits added by the encoder 1104 may be equal to the number of bits needed to complete the generation of the one or more remaining sequences of amplitude bits. In such case, the sequence of amplitude bits used to indicate the boundary may be inserted after the amplitude bits generated based on the padding bits and before any amplitude bits generated based on information bits of the next MPDU. In some such implementations, the number of padding bits added by the encoder 1104 is equal to the smallest number of bits needed (based on the patterns of bit values in the LUT used for the prefix encoding operation) to complete the generation of the one or more remaining sequences of amplitude bits.

In some other implementations, the boundary manager 1106 may track boundaries between other data units, blocks or groups of information bits. In some such implementations, the boundary identified in block 1206 may be a boundary at the end of a group of multiple bytes of information bits of a plurality of groups of multiple bytes of information bits. For example, the group may include information bits for multiple contiguous MPDUs, or may consist of multiple contiguous bytes of information bits within a single MPDU. In some implementations, a length of the group of multiple bytes of information bits is equal to an integer multiple of two-byte or four-byte segments of information bits. For example, each group of multiple bytes of information bits may consist of 1024 bytes or another appropriate number of bytes. In some such implementations, the boundary manager 1106 may insert, into the one or more output bitstreams in block 1208, a boundary sequence between the amplitude bits encoded by the prefix encoding operation for a current group of bytes of information bits and the amplitude bits encoded, or to be encoded, for a next group of bytes of information bits.

As described above, in some implementations, the performance of the prefix encoding operation in block 1204 may further include determining whether the information bits for the current group of bytes of information bits are not enough in number to enable the prefix encoder 1104 to complete the generation of one or more remaining sequences of amplitude bits for the current group. In some such implementations, the encoder 1104 or the boundary manager 1106 may add padding bits after the information bits in the current group, and further perform the prefix encoding operation on the padding bits in block 1204. For example, the number of padding bits added by the encoder 1104 may be equal to the number of bits needed to complete the generation of the one or more remaining sequences of amplitude bits. In such case, the sequence of amplitude bits used to indicate the boundary may be inserted after the amplitude bits generated based on the padding bits and before any amplitude bits generated based on information bits of the next group. In some such implementations, the number of padding bits added by the encoder 1104 is equal to the smallest number of bits needed (based on the patterns of bit values in the LUT used for the prefix encoding operation) to complete the generation of the one or more remaining sequences of amplitude bits.

In some other implementations, the boundary manager 1106 may track boundaries between other data units, blocks or groups of information bits corresponding to a predetermined number of OFDM symbols to be transmitted in the wireless packet with other groups of OFDM symbols by the wireless communication device. In some such implementations, the boundary identified in block 1206 may be a boundary at the end of a group of multiple information bits corresponding to an integer number of OFDM symbols. In some such implementations, the boundary manager 1106 may insert, into the one or more output bitstreams in block 1208, a boundary sequence between the amplitude bits encoded by the prefix encoding operation for a current OFDM symbol and the amplitude bits encoded, or to be encoded, for a next OFDM symbol.

Figure 13:
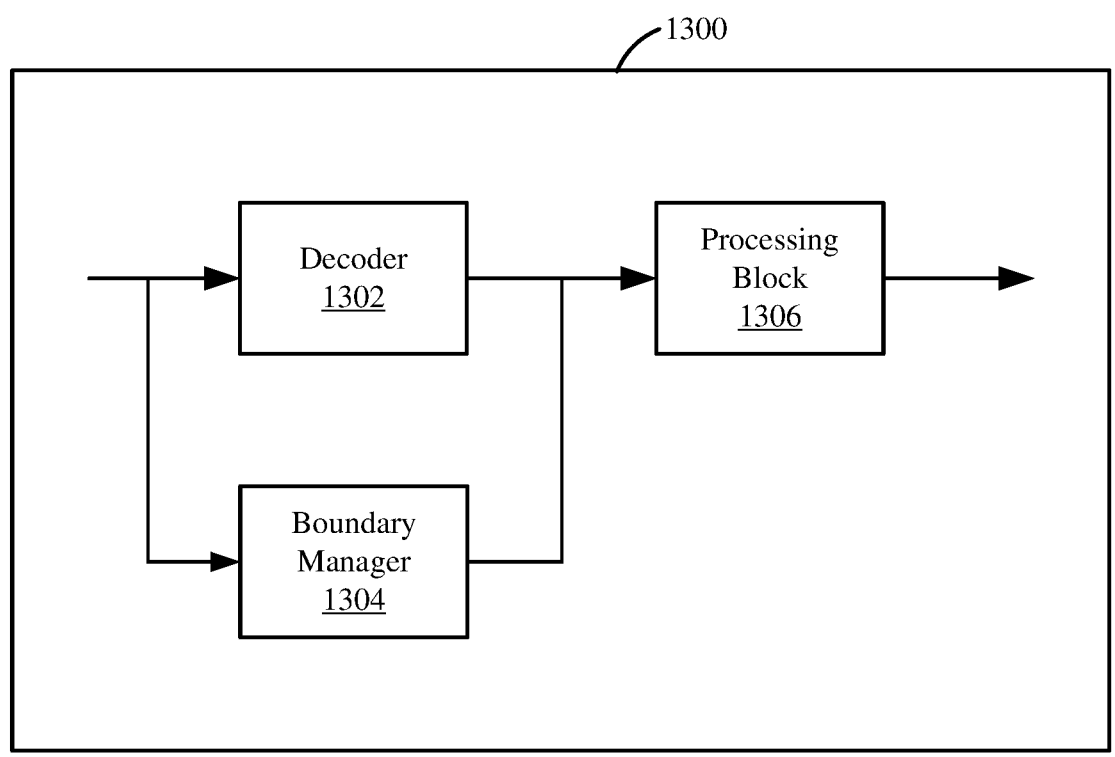
FIG. 13 shows an example wireless communication device that supports boundary identification for prefix decoding according to some implementations.

FIG. 13 shows an example wireless communication device 1300 that supports boundary identification for prefix decoding according to some implementations. The wireless communication device 1300 includes a decoder 1302, a boundary manager 1304 and a processing block 1306. In some implementations, the decoder 1302 may be implemented at least in part by a modem that implements a PHY layer such as the modem 402 described with reference to FIG. 4. In some implementations, the decoder 1302 is or includes a prefix decoder. For example, the decoder 1302 may implement aspects of the shaping decoder 1126 described above with reference to FIG. 11B. The boundary manager 1304 may be coupled with the decoder 1302 and the processing block 1306, and may also be implemented at least in part by the modem. In some other implementations, the boundary manager 1304 may be implemented at least in part by the decoder 1302 itself. In some implementations, the processing block 1306 is implemented at least in part by a processor, such as the processor 404 described with reference to FIG. 4, which may implement a MAC layer. The processing block 1306 may also be implemented at least in part by the modem. In some implementations, the wireless communication device 1300 may further include a systematic decoder (such as the systematic decoder 916), a post-de-shaping deparser (such as the post-de-shaping deparser 930) and a de-padder. In some implementations, the processing block 1306 includes the post-de-shaping deparser and the de-padder.

Figure 14:
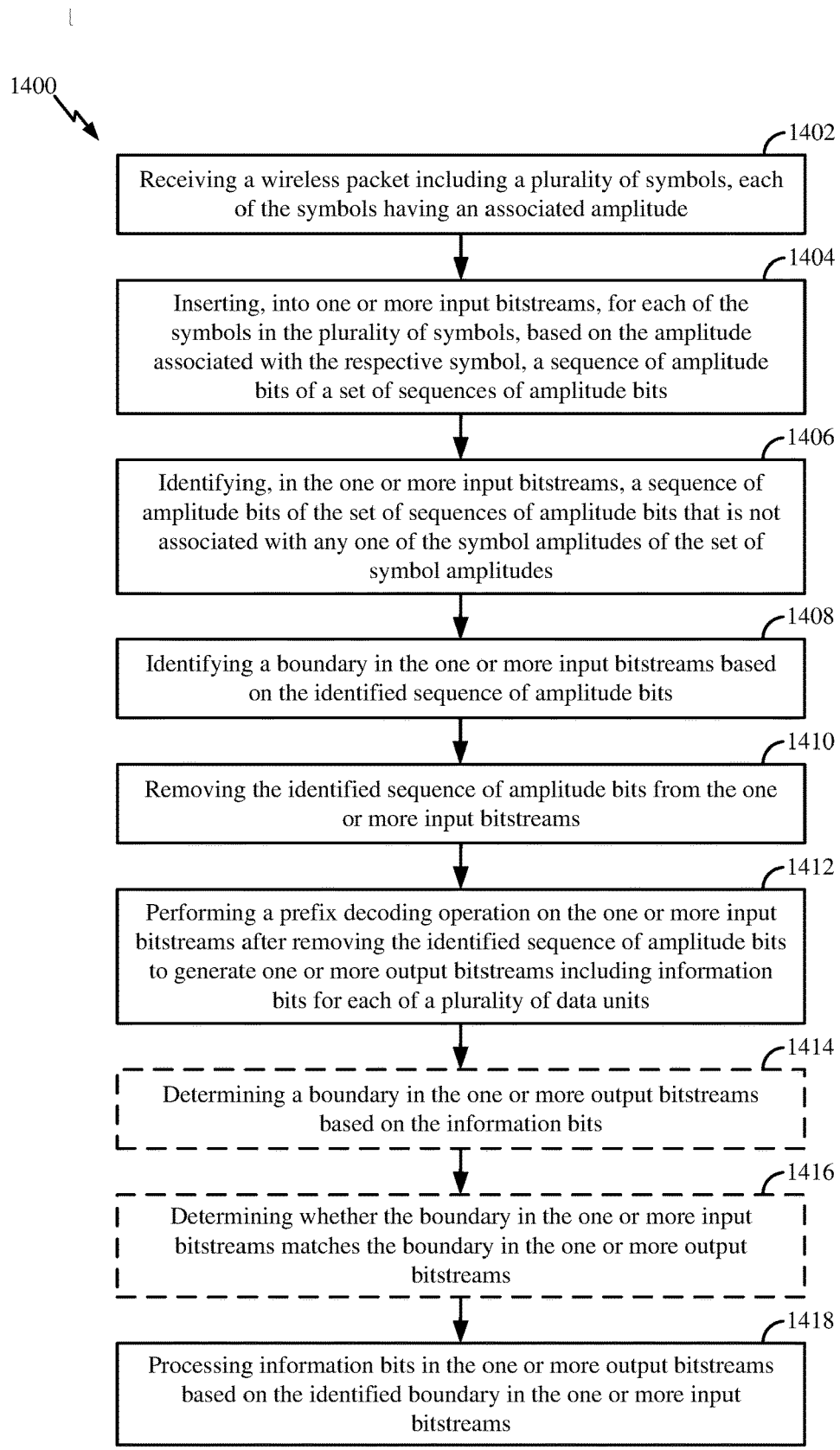
FIG. 14 shows a flowchart illustrating an example process for wireless communication that supports boundary identification for prefix decoding according to some implementations.

FIG. 14 shows a flowchart illustrating an example process 1400 for wireless communication that supports boundary identification for prefix decoding according to some implementations. The operations of the process 1200 may be implemented by a receiving device or its components as described herein. For example, the process 1200 may be performed at least in part by a wireless communication device such as the wireless communication device 1300 described with reference to FIG. 13. In some implementations, the process 1400 may be performed by a wireless communication device operating as or within an AP, such as one of the APs 102 and 502 described with reference to FIGS. 1 and 5A, respectively. In some other implementations, the process 1400 may be performed by a wireless communication device operating as or within a STA, such as one of the STAs 104 and 504 described with reference to FIGS. 1 and 5B, respectively.

In block 1402, the wireless communication device receives a wireless packet including a plurality of symbols, each of the symbols having an associated amplitude. For example, the wireless communication device may receive the wireless packet transmitted by the transmitting device in block 1210 of the process 1200 described with reference to FIG. 12. In block 1404, for each of the symbols in the plurality of received symbols, the wireless communication device inserts, into one or more input bitstreams, based on the amplitude associated with the respective symbol, a sequence of amplitude bits of a set of sequences of amplitude bits. As describe above, each sequence of amplitude bits of the set of sequences of amplitude bits may be different than all of the other sequences of amplitude bits of the set of sequences of amplitude bits but may have a same length as all of the other sequences of amplitude bits. As further described above, each sequence of amplitude bits is associated with a respective symbol amplitude of a set of symbol amplitudes that may be different than all of the other symbol amplitudes of the set of symbol amplitudes. Each sequence of amplitude bits of a plurality of sequences of amplitude bits of the set of sequences of amplitude bits is associated with a respective pattern of bit values of a set of patterns of bit values, a number of patterns of bit values in the set of patterns of bit values being less than a number of sequences of amplitude bits in the set of sequences of amplitude bits. For example, as described above with respect to the process 1200, the set of patterns of bit values may not include patterns 11110 and 11111.

In some implementations, the insertion of the sequences of amplitude bits in block 1404 includes performing, for example, by a systematic decoder such as an LDPC decoder, a first decoding operation (for example, an LDPC decoding operation) on the sequences of amplitude bits to provide decoded sequences of amplitude bits in the one or more input bitstreams.

In block 1406, one or both of the decoder 1302 and the boundary manager 1304 may identify, in the one or more input bitstreams, a sequence of amplitude bits (for example, after decoding by the LDPC decoder) of the set of sequences of amplitude bits that is not associated with any pattern of bit values of a set of patterns of bit values (that is, a boundary sequence). For example, the decoder 1302 or the boundary manager 1304 may identify one of the patterns 11110 or 11111. In block 1408, the boundary manager 1304 may then identify a boundary in the one or more input bitstreams based on the boundary sequence. For example, when the decoder 1302 or the boundary manager 1304 receives either of the sequences of amplitude bits 11110 or 11111, it determines that the respective sequence of amplitude bits indicates a boundary. The decoder 1302 may then remove the boundary sequence from the one or more input bitstreams in block 1410.

After removing the boundary sequence, the decoder 1302 may then perform a decoding operation, and in particular, a prefix decoding operation, on remaining amplitude bits in the one or more input bitstreams in block 1412 that generates one or more output bitstreams including information bits for one or more data units. As described above with reference to the process 800 of FIG. 8, the performance of the prefix decoding operation includes comparing sequences of amplitude bits in the one or more input bitstreams to one or more patterns of bit values of a set of patterns of bit values having non-uniform lengths, each sequence of amplitude bits being associated with a respective pattern of bit values of the set of patterns of bit values, each pattern of bit values of the set of patterns of bit values being associated with a respective sequence of information bits. For example, the decoder 1302 may, in block 1412, identify patterns of bit values of the set of patterns of bit values that match sequences of amplitude bits in the one or more input bitstreams. After matching a current sequence of amplitude bits to one of the patterns of bit values, the decoder 1302 may then insert, into one or more output bitstreams, a sequence of information bits having the pattern of bit values.

For example, suppose that the next sequence of amplitude bits to be decoded by the prefix decoder are 00001. Based on this sequence of amplitude bits, the decoder 1302 may identify the sequence 00001 in the LUT that includes the set of sequences of amplitude bits and the set of patterns of bit values, map the sequence 00001 to the corresponding pattern 10101, and then insert information bits having the pattern 10101 into an output bitstream. In block 1418, the processing block 1306 may then process the information bits in the one or more output bitstreams based on the identified boundary in the one or more input bitstreams. For example, a MAC layer of the wireless communication device 1300 may decode MPDUs assembled from the information bits based on the identified boundary.

In some implementations, the process 1400 may further include determining, by the boundary manager 1304, a boundary in the one or more output bitstreams based on the information bits in block 1414, for example, prior to or during the processing in block 1418. The boundary manager 1304 may then determine whether the boundary in the one or more input bitstreams matches the boundary in the one or more output bitstreams in block 1416. If the boundaries match, the processing block 1306 may then assemble the information bits in the one or more output bitstreams into a data unit (for example, an MPDU) for the processing in block 1418.

In some implementations, the boundary in the one or more output bitstreams may be a boundary between adjacent MPDUs of a plurality of MPDUs that make up an A-MPDU. In some such implementations, the boundary manager 1304 may determine the boundary in the one or more output bitstreams in block 1414 based on higher level processing of the information bits in the one or more output bitstreams. For example, the information bits may be processed by the MAC layer implemented by the processing block 1306 in block 1418 to identify MPDU boundaries, for example, by decoding MPDU delimiters. The processing block 1306 may then signal or otherwise indicate the boundary to the boundary manager 1304 so that the boundary manager may learn or otherwise determine the boundary.

In some other implementations in which the boundary is between adjacent MPDUs, the determination of the boundary in block 1414 may be based on identifying a known sequence of information bits in the one or more output bitstreams. For example, the boundary manager 1304 may be configured to identify one or more typical strings of information bits that are associated with MPDU boundaries, for example, strings of information bits found in MPDU delimiters. As such, the boundary manager 1304 may determine the boundary in block 1414 based on the presence of one of the strings of information bits.

In some implementations, the process 1400 further includes determining, by the decoder 1302 or the boundary manager 1304, whether the performance of the prefix decoding operation in block 1412 generated bits after an end of a current data unit (for example, a current MPDU) and before the boundary. In such implementations, if there are additional bits between the end of the current data unit and the boundary, the decoder 1302 or the boundary manager 1304 may remove the bits between the end of the current data unit and the boundary from the one or more output bitstreams.

In some implementations in which the boundary is between adjacent MPDUs, responsive to a determination by the boundary manager 1304 in block 1416 that the boundary in the one or more input bitstreams matches the boundary in the one or more output bitstreams, the associated information bits are assembled into an MPDU or other data unit by the processing block 1306. For example, the boundary manager 1304 may, in response to determining that the boundaries match in block 1416, determine that the information bits for the current MPDU were successfully decoded and, as a result, pass, or signal another component to pass, the information bits for the MPDU along with other successfully decoded MPDUs in the form of a PSDU to a higher layer of the processing block 1306 for the processing in block 1418, and report, to the higher layer, that the information bits for the MPDU were successfully decoded.

In some implementations in which the boundary is between adjacent MPDUs, responsive to a determination in block 1416 that the boundary in the one or more input bitstreams does not match the boundary in the one or more output bitstreams, the boundary manager 1304 determines that the information bits for current MPDU were not successfully decoded and, as a result, not pass, or signal another component to pass, the information bits for the MPDU to the higher layer of the processing block 1306 for processing, and, in some such implementations, reports a decoding error to the higher layer. The boundary manager 1304 may then reset a boundary counter associated with the information bits in the one or more output bitstreams.

In some implementations in which the boundary is between adjacent MPDUs, responsive to a determination that the boundary in the one or more input bitstreams does not match the boundary in the one or more output bitstreams, the decoder 1302 or the boundary manager 1304 removes the information bits from the one or more output bitstreams after a bit index associated with the boundary in the one or more output bitstreams and before a bit index associated with the boundary in the one or more input bitstreams.

In some other implementations, the boundary in the one or more output bitstreams may be a boundary between adjacent blocks or groups of information bits that make up an A-MPDU. As described above with reference to the process 1200 of FIG. 12, the length of each group of information bits may be equal to an integer multiple of two-byte or four-byte segments of information bits. For example, each group of information bits may consist of 1024 bytes or another appropriate number of bytes. In some such implementations, the process 1400 additionally includes monitoring, by the boundary manager 1304, a number of bytes (or other unit of measurement) of information bits generated by the prefix decoding operation. The boundary manager 1304 may then determine whether the boundary in the one or more input bitstreams is associated with an integer multiple of fixed-length segments of information bits in the one or more output bitstreams. The processing block 1306 may then assemble the information bits in the one or more output bitstreams into one or more data units (for example, MPDUs) based on the determination of whether the boundary in the one or more input bitstreams is associated with an integer multiple of fixed-length segments of information bits in the one or more output bitstreams.

As similarly described above, in some implementations, the process 1400 further includes determining, by the decoder 1302 or the boundary manager 1304, whether the performance of the prefix decoding operation in block 1412 generated bits after an end of a current group of bytes of information bits and before the boundary. In such implementations, if there are additional bits between the end of the current group and the boundary, the decoder 1302 or the boundary manager 1304 may remove the bits between the end of the current group and the boundary from the one or more output bitstreams.

In some implementations in which the boundary is between adjacent groups of bytes of information bits, responsive to a determination that the boundary in the one or more input bitstreams is associated with an integer multiple of fixed-length segments of information bits in the one or more output bitstreams, the boundary manager 1304 determines that the information bits for the group were successfully decoded and, based on the determination that the information bits were successfully decoded, passes, or signals another component to pass, the information bits for the one or more data units (for example, MPDUs) in the group to a higher layer of the processing block 1306 for processing in block 1418, and reports, to the higher layer, that the information bits for the one or more data units were successfully decoded.

In some implementations, responsive to a determination that the boundary in the one or more input bitstreams is not associated with an integer multiple of fixed-length segments of information bits in the one or more output bitstreams, the boundary manager 1304 determines that the information bits for the group were not successfully decoded and, based on the determination that the information bits were not successfully decoded, does not pass, or signal another component to pass, the information bits for the one or more data units in the group to the higher layer for processing, and in some implementations, reports a decoding error to the higher layer. The boundary manager 1304 may then reset a boundary counter associated with the information bits in the one or more output bitstreams.

In some other implementations, the boundary in the one or more output bitstreams may be a boundary between adjacent blocks or groups of information bits that make up an A-MPDU, and process 1400 additionally includes monitoring, by the boundary manager 1304, a number of information bits generated by the prefix decoding operation. The boundary manager 1304, during or after monitoring the number of information bits, may then determine whether the boundary in the one or more input bitstreams is associated with an expected number of information bits in the one or more output bitstreams. The processing block 1306 may then assemble information bits in the one or more output bitstreams into one or more data units (for example, MPDUs) based on the determination of whether the boundary in the one or more input bitstreams is associated with the expected number of information bits in the one or more output bitstreams.

In some such implementations, responsive to a determination that the boundary in the one or more input bitstreams is associated with the expected number of information bits in the one or more output bitstreams, the boundary manager 1304 determines that the information bits for the one or more data units were successfully decoded and, based on the determination that the information bits were successfully decoded, passes, or signals another component to pass, the information bits for the one or more data units (for example, MPDUs) to a higher layer of the processing block 1306 for the processing in block 1418, and reports, to the higher layer, that the information bits for the one or more data units were successfully decoded.

In some such implementations, responsive to a determination that the boundary in the one or more input bitstreams is not associated with the expected number of information bits in the one or more output bitstreams, the boundary manager 1304 determines that the information bits for the one or more data units were not successfully decoded and, based on the determination that the information bits were not successfully decoded, does not pass, or signal another component to pass, the information bits for the one or more data units to the higher layer for processing, and in some implementations, reports a decoding error to the higher layer. The boundary manager 1304 may then reset a boundary counter associated with the information bits in the one or more output bitstreams.

In some other such implementations, responsive to a determination that the boundary in the one or more input bitstreams is not associated with the expected number of information bits in the one or more output bitstreams, the boundary manager 1304 may add, or may signal the decoder 1302 to add, padding bits to the one or more output bitstreams, or remove, or signal the decoder 1302 to remove, information bits from the one or more output bitstreams, such that the one or more output bitstreams consist of the expected number of information bits.

Figure 15:
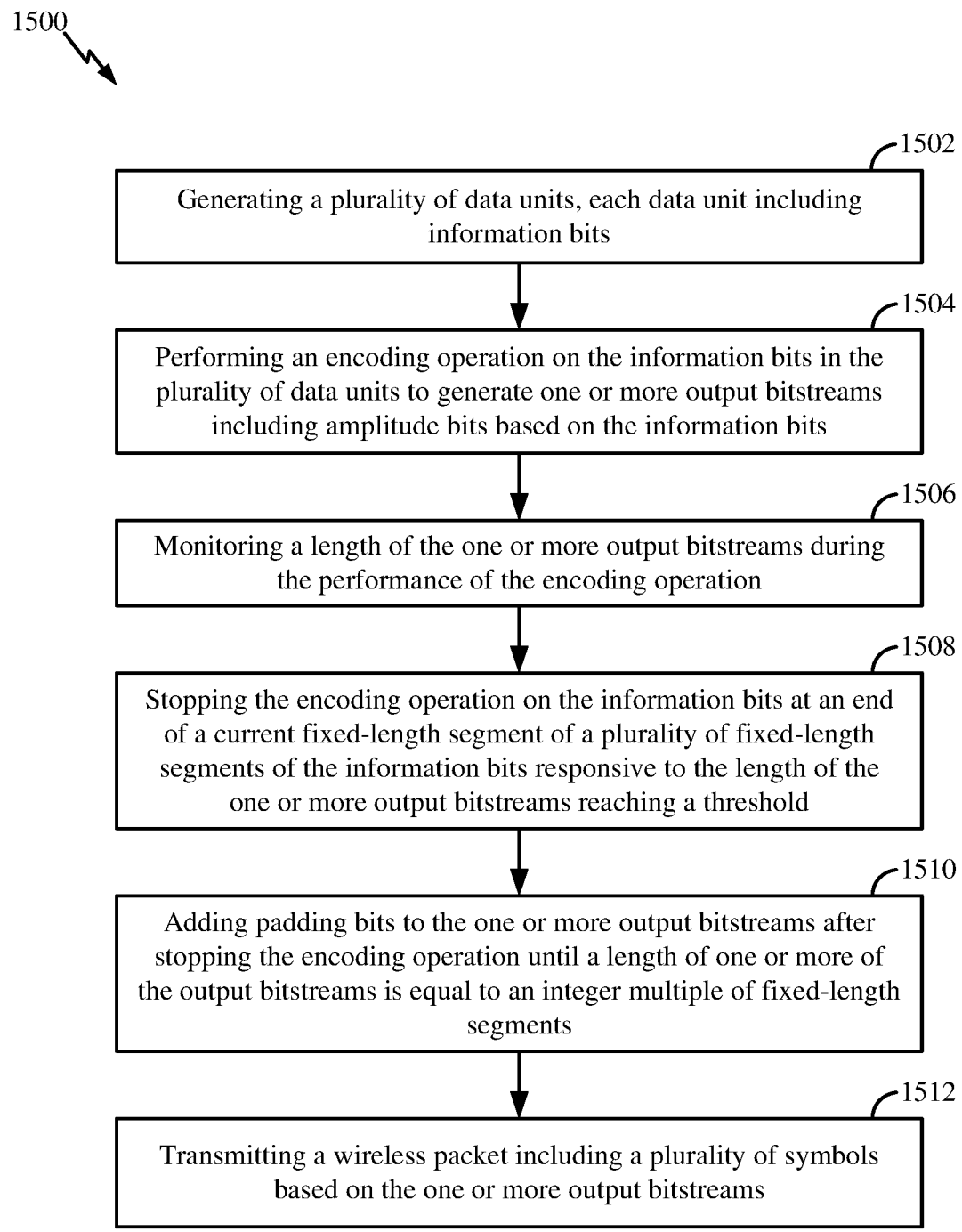
FIG. 15 shows a flowchart illustrating an example process for wireless communication that supports boundary identification for prefix encoding according to some implementations.

FIG. 15 shows a flowchart illustrating an example process 1500 for wireless communication that supports boundary identification for prefix encoding according to some implementations. The operations of the process 1500 may be implemented by a transmitting device or its components as described herein. For example, the process 1500 may be performed at least in part by a wireless communication device such as the wireless communication device 1100 described with reference to FIG. 11. In some implementations, the process 1500 may be performed by a wireless communication device operating as or within an AP, such as one of the APs 102 and 502 described with reference to FIGS. 1 and 5A, respectively. In some other implementations, the process 1500 may be performed by a wireless communication device operating as or within a STA, such as one of the STAs 104 and 504 described with reference to FIGS. 1 and 5B, respectively.

In block 1502, the processing block 1102 generates a plurality of data units, each data unit including information bits. For example, each of the data units may be an MPDU of an A-MPDU to be transmitted in a wireless packet to one or more receiving wireless communication devices. In block 1504, the encoder 1104 performs an encoding operation on the information bits in the plurality of data units that generates one or more output bitstreams including amplitude bits for each of the data units based on the information bits for the data units. For example, the encoder 1104 may be, or may include, a prefix encoder for performing a prefix encoding operation on the information bits in block 1504. As described above, the performance of the prefix encoding operation may include comparing sequences of consecutive bits of the information bits to one or more patterns of bit values of a set of patterns of bit values having non-uniform lengths. As described above, the patterns of bit values may be defined such that each of the patterns of bit values has an associated probability of occurrence in the information bits based in part on its length, and specifically, such that the patterns of bit values associated with relatively lower symbol amplitudes have relatively higher probabilities of occurrence than the patterns of bit values associated with relatively higher symbol amplitudes.

As described above with reference to the process 1200 of FIG. 12, in some implementations configured for 4096 QAM, there may be up to thirty-two possible sequences of information bits that may be input into the prefix encoder for the prefix encoding operation. Each possible sequence of information bits has a pattern of bit values of a set of patterns of bit values that is associated with a respective sequence of amplitude bits of a corresponding set of sequences of amplitude bits. As described above, each sequence of amplitude bits may be different than all of the other sequences of amplitude bits of the set of sequences of amplitude bits such that each sequence of amplitude bits may be associated with a single pattern of bit values associated with a corresponding sequence of information bits. However, each sequence of amplitude bits may have a same length as all of the other sets of sequences of amplitude bits. For example, when configured for 4096 QAM, each sequence of amplitude bits may consist of five bit values representing the magnitude of either the in-phase (I) component or the quadrature (Q) component of the amplitude of an associated symbol. Each sequence of amplitude bits may be associated with a respective symbol amplitude of a set of symbol amplitudes that may be different than all of the other symbol amplitudes of the set of symbol amplitudes.

As described above with reference to the processes 600 and 1200 of FIGS. 6 and 12, the performance of the prefix encoding operation in block 1504 may include identifying patterns of bit values of the set of patterns of bit values that match a sequence of consecutive bits of the information bits. After matching a sequence of information bits to one of the patterns of bit values, the encoder 1104 may then insert, into one or more output bitstreams, a sequence of amplitude bits that is associated with the pattern of bit values.

In some implementations, in block 1506, during the performance of the encoding operation in block 1504, the encoder 1104 or the boundary manager 1106 monitors a length of the amplitude bits in the one or more output bitstreams. In some such implementations, the encoder 1104 stops the encoding operation on the information bits in block 1508 at an end of a current byte segment of an integer multiple of fixed-length segments of the information bits responsive to the length of the amplitude bits in the one or more output bitstreams reaching a threshold. For example, each of the fixed-length segments may be a two-byte segment. In some other examples, each of the fixed-length segments may be a four-byte segment.

For example, suppose it is desired that each of the fixed-length segments is a two-byte segment. Suppose also that an LDPC coding rate of 5/6 is selected for use with 1024-QAM or 4096-QAM. In such an example, each codeword would have a length of 1944 bits, which requires 1620 bits to be input into the LDPC encoder. 1620 bits corresponds to a 202.5 byte equivalent length, which equals an equivalent length of 101.25 two-byte segments. The nearest whole integer multiple of 101.25 is 405. As such, 405 two-byte segments would be required to be input into the LDPC encoder, which would result in four codewords. In some implementations, when the monitored length of the amplitude bits in the one or more output bitstreams passes the end of the $404^{th}$ two-byte segment of amplitude bits, but before it reaches the end of the $405^{th}$ two-byte segment of amplitude bits, the encoder 1104 stops the encoding operation.

In block 1510, the encoder 1104 or the boundary manager 1106 may then add padding bits to the one or more output bitstreams after the encoding operation is stopped until a length of one or more of the output bitstreams is equal to an integer multiple of fixed-length segments. For example, continuing the two-byte segment example, the encoder 1104 would pad the amplitude bits in one or more of the output bitstreams until the end of the $405^{th}$ two-byte segment.

The wireless communication device 1100 may repeat the performance of blocks 1504, 1506, 1508 and 1510 for multiple blocks or groups of information bits. The wireless communication device 1100 may then transmit, in block 1512, a wireless packet including a plurality of symbols based on the one or more output bitstreams generated for each of the blocks or groups of information bits.

Figure 16:
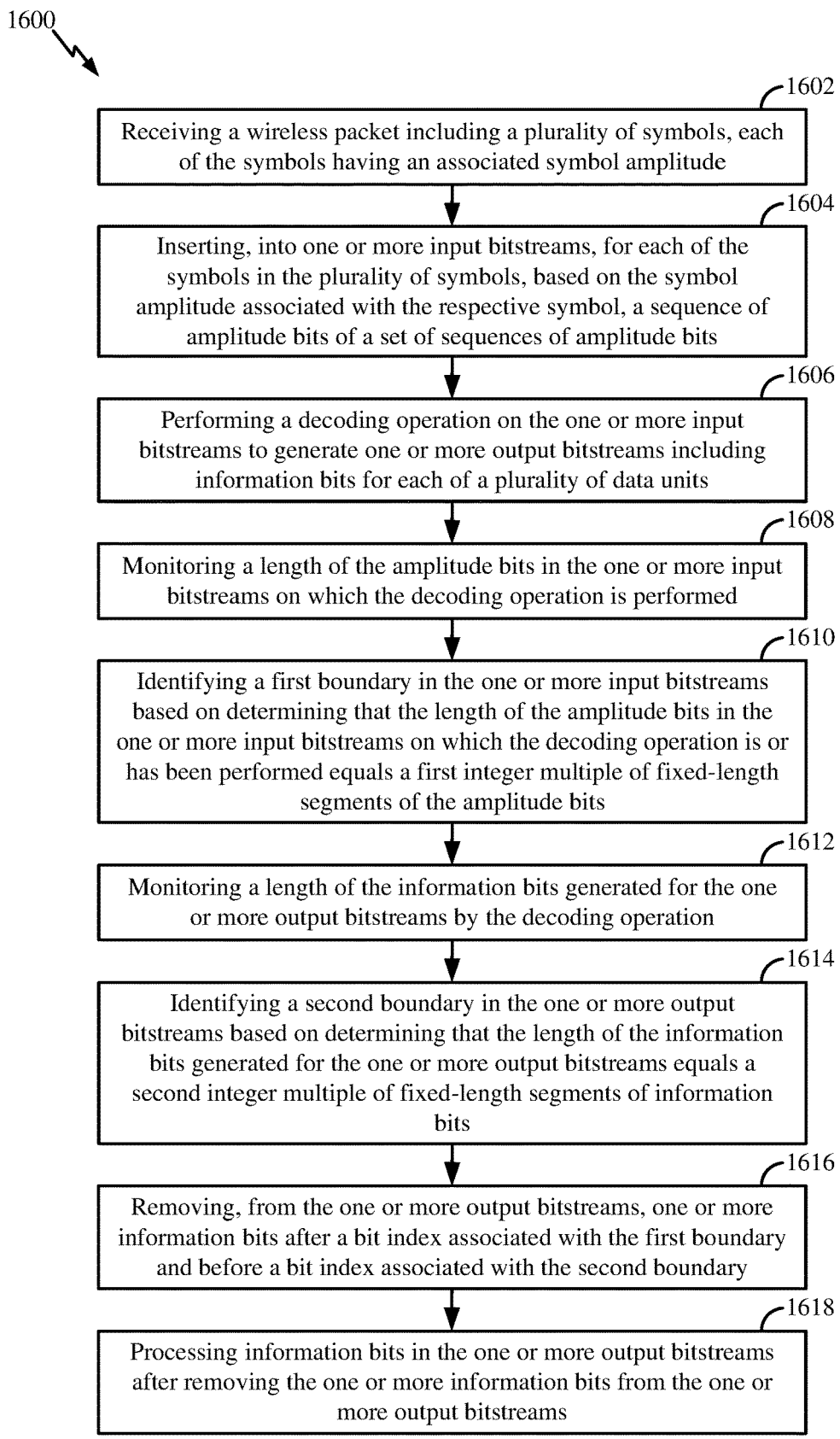
FIG. 16 shows a flowchart illustrating an example process for wireless communication that supports boundary identification for prefix decoding according to some implementations.

FIG. 16 shows a flowchart illustrating an example process 1600 for wireless communication that supports boundary identification for prefix decoding according to some implementations. The operations of the process 1600 may be implemented by a receiving device or its components as described herein. For example, the process 1600 may be performed at least in part by a wireless communication device such as the wireless communication device 1300 described with reference to FIG. 13. In some implementations, the process 1600 may be performed by a wireless communication device operating as or within an AP, such as one of the APs 102 and 502 described with reference to FIGS. 1 and 5A, respectively. In some other implementations, the process 1600 may be performed by a wireless communication device operating as or within a STA, such as one of the STAs 104 and 504 described with reference to FIGS. 1 and 5B, respectively.

In block 1602, the wireless communication device receives a wireless packet including a plurality of symbols, each of the symbols having an associated amplitude. For example, the wireless communication device may receive the wireless packet transmitted by the transmitting device in block 1512 of the process 1500 described with reference to FIG. 15. In block 1604, for each of the symbols in the plurality of received symbols, the wireless communication device inserts, into one or more input bitstreams, based on the amplitude associated with the respective symbol, a sequence of amplitude bits of a set of sequences of amplitude bits. As describe above, each sequence of amplitude bits of the set of sequences of amplitude bits may be different than all of the other sequences of amplitude bits of the set of sequences of amplitude bits but may have a same length as all of the other sequences of amplitude bits. As further described above, each sequence of amplitude bits is associated with a respective symbol amplitude of a set of symbol amplitudes that may be different than all of the other symbol amplitudes of the set of symbol amplitudes. Each sequence of amplitude bits may be associated with a respective pattern of bit values of a set of patterns of bit values, for example, as described above with respect to Table 1.

In some implementations, the insertion of the sequences of amplitude bits in block 1604 includes performing, for example, by a systematic decoder such as an LDPC decoder, a first decoding operation (for example, an LDPC decoding operation) on the sequences of amplitude bits to provide decoded sequences of amplitude bits in the one or more input bitstreams.

In block 1606, the decoder 1302 performs a decoding operation on the amplitude bits in the one or more input bitstreams that generates one or more output bitstreams including information bits for one or more data units (for example, MPDUs). For example, the decoder 1302 may be, or may include, a prefix decoder for performing a prefix decoding operation in block 1606. As described above with reference to the process 800 of FIG. 8, the performance of the prefix decoding operation may include comparing sequences of amplitude bits in the one or more input bitstreams to one or more patterns of bit values of a set of patterns of bit values having non-uniform lengths, each respective sequence of amplitude bits being associated with a respective pattern of bit values of the set of patterns of bit values, each pattern of bit values of the set of patterns of bit values being associated with a respective sequence of information bits. For example, the decoder 1302 may, in block 1606, identify patterns of bit values of the set of patterns of bit values that match sequences of amplitude bits in the one or more input bitstreams. For example, after matching a current sequence of amplitude bits to one of the patterns of bit values, the decoder 1302 may then insert, into one or more output bitstreams, a sequence of information bits having the pattern of bit values.

In block 1608, the decoder 1302 or the boundary manager 1304 may monitor the length (for example, as a number of bytes) of the amplitude bits in the one or more input bitstreams on which the decoding operation is, or has been, performed. In block 1610, the boundary manager 1304 may identify a first boundary in the one or more input bitstreams based on determining that the length of amplitude bits in the one or more input bitstreams on which the decoding operation is or has been performed equals a first integer multiple of fixed-length segments of amplitude bits. In some implementations, each of the fixed-length segments may be a two-byte segment or, in some other implementations, each of the fixed-length segments may be a four-byte segment. For example, as described with reference to the process 1500 of FIG. 15, each of the fixed-length segments may be a two-byte segment and the boundary manager 1304 may determine that the boundary is at the end of the 405$^{th}$ two-byte segment.

In block 1612, the decoder 1302 or the boundary manager 1304 may monitor the length (for example, as a number of bytes) of information bits generated for the one or more output bitstreams by the decoding operation. In block 1614, the boundary manager 1304 may identify a boundary in the one or more output bitstreams based on determining that the length of the information bits generated for the one or more output bitstreams equals a second integer multiple of fixed-length segments of information bits. For example, the boundary manager 1304 may identify the boundary as the end of a current fixed-length segment. In block 1616, the decoder 1302 or the boundary manager 1304 may then remove, from the one or more output bitstreams, one or more information bits after a bit index associated with the boundary in the one or more input bitstreams and before a bit index associated with the boundary in the one or more output bitstreams.

For example, as described above with reference to the process 1500, the boundary in the amplitude bits may be at the end of the 405$^{th}$ byte, for example, an 1620$^{th}$ bit in a fourth codeword (for example, a bit index or position "1620"). Suppose also that, at the time of the decoding of the 1620$^{th}$ bit of the fourth codeword, the bit index or position associated with the most recently decoded information bit is 1458 (in other words, 1458 information bits have been decoded). 1458 bits represents 182.25 bytes, or 91.125 two-byte segments. In such an example, the decoder 1302 or the boundary manager 1304 may determine that the boundary in the one or more output bitstreams is at the end of the 91$^{st}$ byte, or bit index 1456. As such, the decoder 1302 or the boundary manager may then remove, in block 1616, bits 1457 and 1458.

The wireless communication device 1300 may repeat the performance of blocks 1604-1616 for multiple blocks or groups of information bits. In block 1618, the processing block 1306 may then process the information bits for the multiple blocks or groups of information bits. For example, a MAC layer of the wireless communication device 1300 may decode MPDUs assembled from the information bits.

Figure 17:
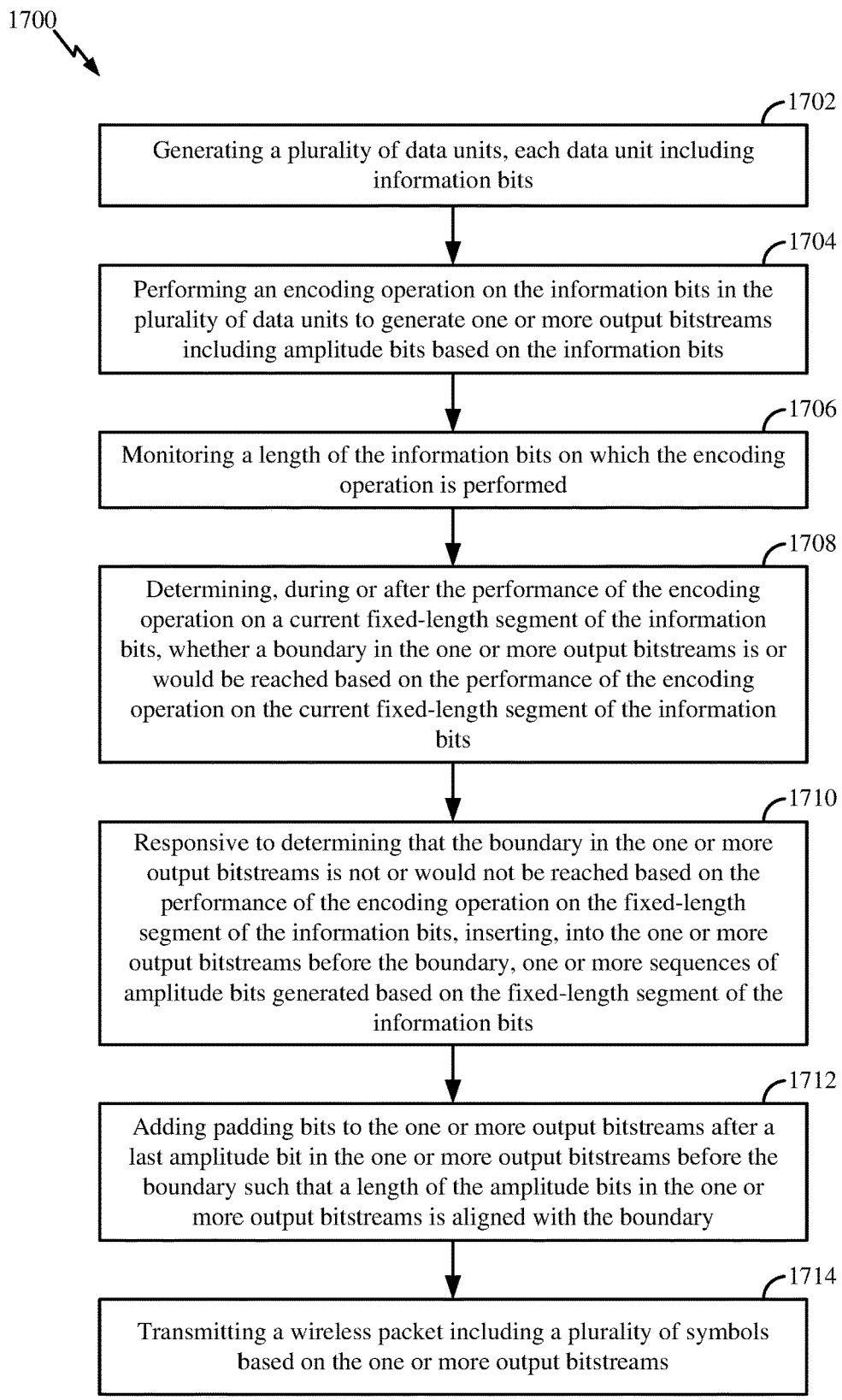
FIG. 17 shows a flowchart illustrating an example process for wireless communication that supports boundary identification for prefix encoding according to some implementations.

FIG. 17 shows a flowchart illustrating an example process 1700 for wireless communication that supports boundary identification for prefix encoding according to some implementations. The operations of the process 1700 may be implemented by a transmitting device or its components as described herein. For example, the process 1700 may be performed at least in part by a wireless communication device such as the wireless communication device 1100 described with reference to FIG. 11. In some implementations, the process 1700 may be performed by a wireless communication device operating as or within an AP, such as one of the APs 102 and 502 described with reference to FIGS. 1 and 5A, respectively. In some other implementations, the process 1700 may be performed by a wireless communication device operating as or within a STA, such as one of the STAs 104 and 504 described with reference to FIGS. 1 and 5B, respectively.

In block 1702, the processing block 1102 generates a plurality of data units, each data unit including information bits. For example, each of the data units may be an MPDU of an A-MPDU to be transmitted in a wireless packet to one or more receiving wireless communication devices. In block 1704, the encoder 1104 performs an encoding operation on the information bits in the plurality of data units that generates one or more output bitstreams including amplitude bits for each of the data units based on the information bits for the data units. For example, the encoder 1104 may be, or may include, a prefix encoder for performing a prefix encoding operation on the information bits in block 1704. As described above, the performance of the prefix encoding operation may include comparing sequences of consecutive bits of the information bits to one or more patterns of bit values of a set of patterns of bit values having non-uniform lengths. As described above, the patterns of bit values may be defined such that each of the patterns of bit values has an associated probability of occurrence in the information bits based in part on its length, and specifically, such that the patterns of bit values associated with relatively lower symbol amplitudes have relatively higher probabilities of occurrence than the patterns of bit values associated with relatively higher symbol amplitudes.

As described above with reference to the process 1200 of FIG. 12, in some implementations configured for 4096 QAM, there may be up to thirty-two possible sequences of information bits that may be input into the prefix encoder for the prefix encoding operation. Each possible sequence of information bits has a pattern of bit values of a set of patterns of bit values that is associated with a respective sequence of amplitude bits of a corresponding set of sequences of amplitude bits. As described above, each sequence of amplitude bits may be different than all of the other sequences of amplitude bits of the set of sequences of amplitude bits such that each sequence of amplitude bits may be associated with a single pattern of bit values associated with a corresponding sequence of information bits. However, each sequence of amplitude bits may have a same length as all of the other sets of sequences of amplitude bits. For example, when configured for 4096 QAM, each sequence of amplitude bits may consist of five bit values representing the magnitude of either the in-phase (I) component or the quadrature (Q) component of the amplitude of an associated symbol. Each sequence of amplitude bits may be associated with a respective symbol amplitude of a set of symbol amplitudes that may be different than all of the other symbol amplitudes of the set of symbol amplitudes.

As described above with reference to the processes 600, 1200 and 1500 of FIGS. 6, 12 and 15, the performance of the prefix encoding operation in block 1704 may include identifying patterns of bit values of the set of patterns of bit values that match a sequence of consecutive bits of the information bits. After matching a sequence of information bits to one of the patterns of bit values, the encoder 1104 may then insert, into one or more output bitstreams, a sequence of amplitude bits that is associated with the pattern of bit values.

In some implementations, in block 1706, during the performance of the encoding operation in block 1704, the encoder 1104 or the boundary manager 1106 monitors a length of the information bits on which the encoding operation is, or has been, performed. For example, the boundary manager 1106 may track boundaries between adjacent fixed-length segments of information bits in the one or more input bitstreams. For example, each of the fixed-length segments may be a two-byte segment. In some other examples, each of the fixed-length segments may be a four-byte segment. In some such implementations, for each fixed-length segment of the information bits encoded or being decoded by the encoder 1104 in block 1704, the boundary manager 1106 determines, in block 1708, during or after the performance of the encoding operation on the fixed-length segment, whether a boundary in the one or more output bitstreams is or would be reached based on the performance of the encoding operation on the fixed-length segment of the information bits.

In some implementations, the boundary in the one or more output bitstreams is a boundary between adjacent codewords. For example, the boundary manager 1106 may track boundaries between codewords or between groups of codewords in the one or more input bitstreams. For example, each group of codewords may consist of two consecutive codewords or may consist of four consecutive codewords. In some implementations, the boundary manager 1106 forces the information bits for each codeword or group of codewords to align with an ending boundary of a last completely encoded fixed-length segment of the information bits. In some such implementations, the greater the number of codewords that are included in each group of codewords, the less boundary protection is provided for the data units. However, in some such implementations, the greater the number of codewords that are included in each group of codewords the implementations, the less overhead (for example, in the form of padding bits that do not carry information) is required.

In block 1710, responsive to a determination that the boundary in the one or more output bitstreams is not or would not be reached based on the performance of the encoding operation on the current fixed-length segment of the information bits, the encoder inserts, into the one or more output bitstreams before the boundary, one or more sequences of amplitude bits generated based on the encoding of the current fixed-length segment. As described above with respect to block 1204 of the process 1200 described with reference to FIG. 12, in some implementations, the performance of a prefix encoding operation in block 1704 may further include determining whether the information bits for the current fixed-length segment are not enough in number to enable the encoder 1104 (a prefix encoder) to complete the generation of one or more remaining sequences of amplitude bits for the current fixed-length segment. In some such implementations, the performance of the prefix encoding operation in block 1704 may further include encoding a number of information bits from a next fixed-length segment of the information bits to complete the generation of the one or more remaining sequences of amplitude bits for the current fixed-length segment (where the number of information bits taken from the next fixed-length segment is equal to the number of bits needed to complete the generation of the one or more remaining sequences of amplitude bits). In some such implementations, the number of information bits taken from the next fixed-length segment is equal to the smallest number of bits needed (based on the patterns of bit values in the LUT used for the prefix encoding operation) to complete the generation of the one or more remaining sequences of amplitude bits.

In contrast, responsive to a determination that the boundary in the one or more output bitstreams is or would be reached based on the performance of the encoding operation on the current fixed-length segment of the information bits, the encoder 1104 does not insert or otherwise include, in the one or more output bitstreams before the boundary, any amplitude bits generated based on the information bits in the current fixed-length segment. However, in some implementations, the information bits in the current fixed-length segment may be encoded by the encoder 1104 and the amplitude bits generated therefrom may be included after the boundary in a next group of amplitudes bits, for example, in a next codeword or group of codewords.

As described above, in some implementations, the performance of a prefix encoding operation in block 1704 may further include determining whether the information bits for the previous fixed-length segment (immediately before the current fixed-length segment) are not enough in number to enable the encoder 1104 to complete the generation of one or more remaining sequences of amplitude bits for the previous fixed-length segment. In some such implementations, the encoder 1104 or the boundary manager 1106 may, in block 1704, add padding bits after the information bits in the previous fixed-length segment, and further perform the prefix encoding operation on the padding bits. In some such implementations, the number of padding bits added by the encoder 1104 is equal to the smallest number of bits needed (based on the patterns of bit values in the LUT used for the prefix encoding operation) to complete the generation of the one or more remaining sequences of amplitude bits.

In block 1712, the encoder 1104 or the boundary manager 1106 may add padding bits to the one or more output bitstreams after the last amplitude bits (and any padding bits needed to complete the amplitude bits) encoded based on the information bits in the previous fixed-length segment before the boundary. In this way, the length of the amplitude bits in the one or more output bitstreams may be aligned with the boundary.

The wireless communication device 1100 may repeat the performance of blocks 1704, 1706, 1708, 1710 and 1712 for multiple groups of amplitude bits, for example, multipole codewords or groups of codewords. The wireless communication device 1100 may then transmit, in block 1714, a wireless packet including a plurality of symbols based on the one or more output bitstreams generated for each of the blocks or groups of information bits.

Figure 18:
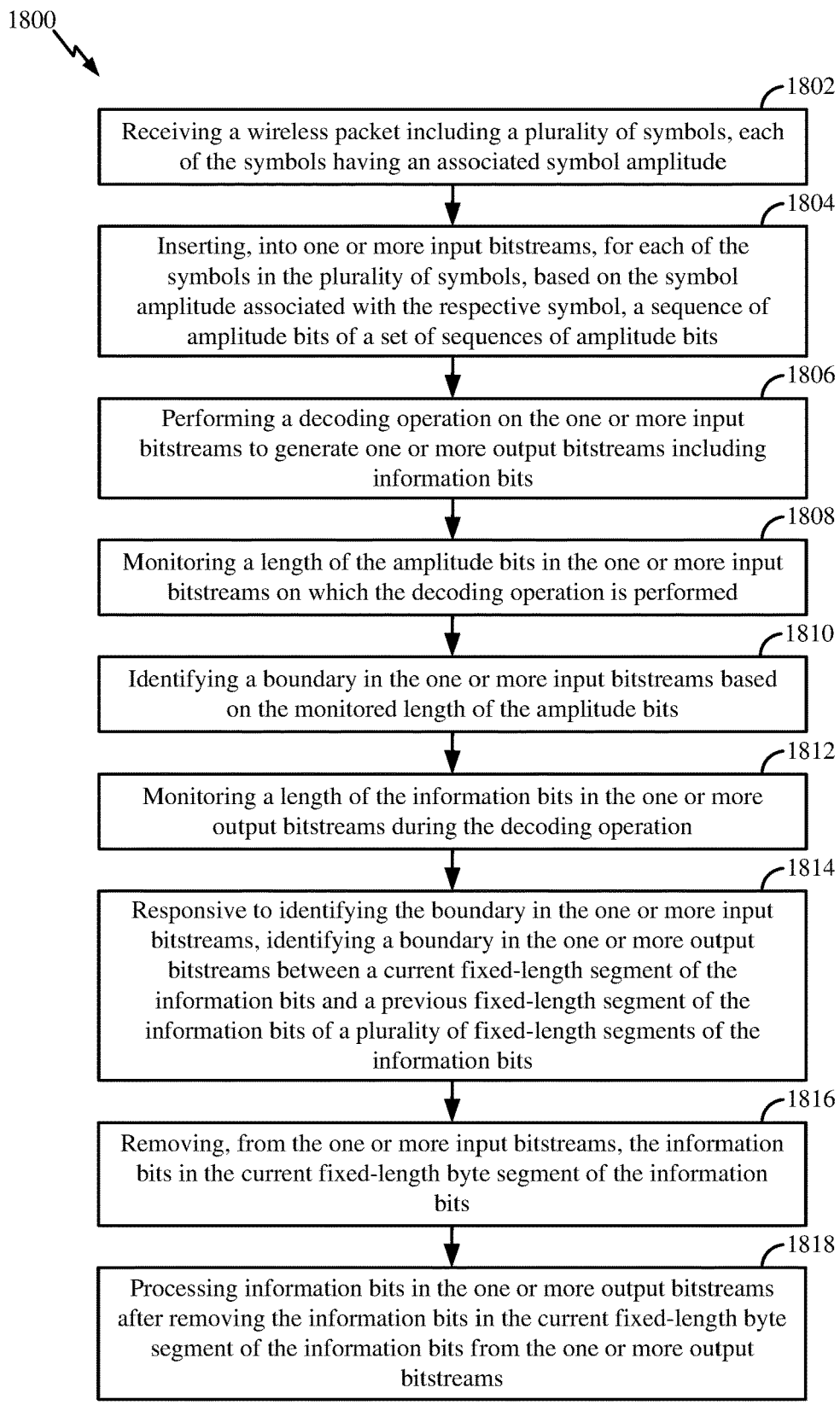
FIG. 18 shows a flowchart illustrating an example process for wireless communication that supports boundary identification for prefix decoding according to some implementations.

FIG. 18 shows a flowchart illustrating an example process 1800 for wireless communication that supports boundary identification for prefix decoding according to some implementations. The operations of the process 1800 may be implemented by a receiving device or its components as described herein. For example, the process 1800 may be performed at least in part by a wireless communication device such as the wireless communication device 1300 described with reference to FIG. 13. In some implementations, the process 1800 may be performed by a wireless communication device operating as or within an AP, such as one of the APs 102 and 502 described with reference to FIGS. 1 and 5A, respectively. In some other implementations, the process 1800 may be performed by a wireless communication device operating as or within a STA, such as one of the STAs 104 and 504 described with reference to FIGS. 1 and 5B, respectively.

In block 1802, the wireless communication device receives a wireless packet including a plurality of symbols, each of the symbols having an associated amplitude. For example, the wireless communication device may receive the wireless packet transmitted by the transmitting device in block 1714 of the process 1700 described with reference to FIG. 17. In block 1804, for each of the symbols in the plurality of received symbols, the wireless communication device inserts, into one or more input bitstreams, based on the amplitude associated with the respective symbol, a sequence of amplitude bits of a set of sequences of amplitude bits. As describe above, each sequence of amplitude bits of the set of sequences of amplitude bits may be different than all of the other sequences of amplitude bits of the set of sequences of amplitude bits but may have a same length as all of the other sequences of amplitude bits. As further described above, each sequence of amplitude bits is associated with a respective symbol amplitude of a set of symbol amplitudes that may be different than all of the other symbol amplitudes of the set of symbol amplitudes. Each sequence of amplitude bits may be associated with a respective pattern of bit values of a set of patterns of bit values, for example, as described above with respect to Table 1.

In some implementations, the insertion of the sequences of amplitude bits in block 1804 includes performing, for example, by a systematic decoder such as an LDPC decoder, a first decoding operation (for example, an LDPC decoding operation) on the sequences of amplitude bits to provide decoded sequences of amplitude bits in the one or more input bitstreams.

In block 1806, the decoder 1302 performs a decoding operation on the amplitude bits in the one or more input bitstreams that generates one or more output bitstreams including information bits for one or more data units (for example, MPDUs). For example, the decoder 1302 may be, or may include, a prefix decoder for performing a prefix decoding operation in block 1806. As described above with reference to the process 800 of FIG. 8, the performance of the prefix decoding operation may include comparing sequences of amplitude bits in the one or more input bitstreams to one or more patterns of bit values of a set of patterns of bit values having non-uniform lengths, each sequence of amplitude bits being associated with a respective pattern of bit values of the set of patterns of bit values, each pattern of bit values of the set of patterns of bit values being associated with a respective sequence of information bits. For example, the decoder 1302 may, in block 1806, identify patterns of bit values of the set of patterns of bit values that match sequences of amplitude bits in the one or more input bitstreams. For example, after matching a current sequence of amplitude bits to one of the patterns of bit values, the decoder 1302 may then insert, into one or more output bitstreams, a sequence of information bits having the pattern of bit values.

In block 1808, the decoder 1302 or the boundary manager 1304 may monitor the length (for example, as a number of bytes) of the amplitude bits in the one or more input bitstreams on which the decoding operation is, or has been, performed. In block 1810, the boundary manager 1304 may identify a boundary in the one or more input bitstreams based on the monitored length of the amplitude bits. In some implementations, the boundary in the one or more input bitstreams is a boundary between adjacent codewords. For example, the boundary manager 1304 may track boundaries between codewords or between groups of codewords in the one or more input bitstreams. For example, each group of codewords may consist of two consecutive codewords or may consist of four consecutive codewords.

In block 1812, the decoder 1302 or the boundary manager 1304 may monitor the length (for example, as a number of bytes) of the information bits in the one or more output bitstreams during the decoding operation. In block 1814, responsive to identifying the boundary in the one or more input bitstreams, the decoder 1302 or the boundary manager 1304 may identify a boundary in the one or more output bitstreams between a fixed-length segment of the information bits currently being decoded, or which has most recently been decoded, and an immediately previous adjacent fixed-length segment of the information bits. For example, each of the fixed-length segments may be a two-byte segment. In some other examples, each of the fixed-length segments may be a four-byte segment. As similarly described above with respect to the process 1700 of FIG. 17, in some implementations, the boundary manager 1304 forces the information bits for each codeword or group of codewords to align with an ending boundary of a last completely decoded fixed-length segment of the information bits. As such, in block 1816, the decoder 1302 or the boundary manager 1304 may remove, from the one or more output bitstreams, the information bits in the current fixed-length segment of the information bits.

The wireless communication device 1300 may repeat the performance of blocks 1804-1816 for multiple blocks or groups of information bits. In block 1818, the processing block 1306 may then process the information bits for the multiple blocks or groups of information bits. For example, a MAC layer of the wireless communication device 1300 may decode MPDUs assembled from the information bits.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, the method comprising:
  generating a plurality of data units, each data unit including information bits;
  performing a prefix encoding operation on the information bits in the plurality of data units that generates one or more output bitstreams including amplitude bits for each of the data units based on the information bits in the data units, the performance of the prefix encoding operation including comparing sequences of consecutive bits of the information bits to one or more patterns of bit values of a set of patterns of bit values, each pattern of bit values of the set of patterns of bit values being associated with a respective sequence of amplitude bits of a set of sequences of amplitude bits, each sequence of amplitude bits of the set of sequences of amplitude bits being associated with a respective symbol amplitude of a set of symbol amplitudes, a number of patterns of bit values in the set of patterns of bit values being less than a number of sequences of amplitude bits in the set of sequences of amplitude bits;
  identifying a boundary in the information bits;
  inserting, into the one or more output bitstreams, based on the identified boundary, a sequence of amplitude bits of the set of sequences of amplitude bits that is not associated with any of the patterns of bit values of the set of patterns of bit values, the inserted sequence of amplitude bits indicating the boundary; and
  transmitting a wireless packet including a plurality of symbols based on the one or more output bitstreams.

2. The method of claim 1, wherein:
  each sequence of amplitude bits of the set of sequences of amplitude bits is different than all of the other sequences of amplitude bits of the set of sequences of amplitude bits but has a same length as all of the other sequences of amplitude bits of the set of sequences of amplitude bits; and each symbol amplitude of the set of symbol amplitudes is different than all of the other symbol amplitudes of the set of symbol amplitudes.

3. The method of claim 1, wherein the boundary is a boundary between adjacent data units of the plurality of data units, the method further comprising:

determining whether the information bits for a current data unit are not enough in number to enable the performance of the prefix encoding operation to generate one or more sequences of amplitude bits for the current data unit;

adding padding bits to the information bits in the current data unit; and further performing the prefix encoding operation on the padding bits, wherein a number of added padding bits is equal to the number of bits needed to complete the generation of the one or more sequences of amplitude bits, wherein the sequence of amplitude bits of the set of sequences of amplitude bits that is not associated with any one of the patterns of bit values of the set of patterns of bit values is inserted after the amplitude bits generated based on the padding bits and before any amplitude bits generated based on information bits of a next data unit.

4. The method of claim 1, wherein the boundary is a boundary at the end of a group of multiple bytes of information bits of a plurality of groups of multiple bytes of information bits, the method further comprising:

determining whether the information bits for a current group are not enough in number to enable the performance of the prefix encoding operation to generate one or more sequences of amplitude bits for the current group;

adding padding bits to the information bits in the current group; and further performing the prefix encoding operation on the padding bits, wherein a number of added padding bits is equal to the number of bits needed to complete the generation of the one or more sequences of amplitude bits, wherein the sequence of amplitude bits of the set of sequences of amplitude bits that is not associated with any one of the patterns of bit values of the set of patterns of bit values is inserted after the amplitude bits generated based on the padding bits and before any amplitude bits generated based on information bits of a next data unit.

5. The method of claim 4, wherein the group comprises multiple contiguous data units of the plurality of data units or multiple contiguous bytes of information bits within a single data unit of the plurality of data units.

6. The method of claim 5, wherein a length of the group of multiple bytes of information bits is equal to an integer multiple of two-byte segments of the information bits or an integer multiple of four-byte segments of the information bits.

7. The method of claim 1, wherein the boundary is a boundary at the end of a group of multiple information bits corresponding to an integer number of orthogonal frequency division multiplexing (OFDM) symbols.

8. A wireless communication device, comprising:
at least one processor; and
at least one memory communicatively coupled with the at least one processor and storing processor-readable code that, when executed by the at least one processor, is configured to cause the wireless communication device to:

generate a plurality of data units, each data unit including information bits;

perform a prefix encoding operation on the information bits in the plurality of data units that generates one or more output bitstreams including amplitude bits for each of the data units based on the information bits in the data units, the performance of the prefix encoding operation including comparing sequences of consecutive bits of the information bits to one or more patterns of bit values of a set of patterns of bit values, each pattern of bit values of the set of patterns of bit values being associated with a respective sequence of amplitude bits of a set of sequences of amplitude bits, each sequence of amplitude bits of the set of sequences of amplitude bits being associated with a respective symbol amplitude of a set of symbol amplitudes, a number of patterns of bit values in the set of patterns of bit values being less than a number of sequences of amplitude bits in the set of sequences of amplitude bits;

identify a boundary in the information bits;

insert, into the one or more output bitstreams, based on the identified boundary, a sequence of amplitude bits of the set of sequences of amplitude bits that is not associated with any of the patterns of bit values of the set of patterns of bit values, the inserted sequence of amplitude bits indicating the boundary; and transmit a wireless packet including a plurality of symbols based on the one or more output bitstreams.

9. The wireless communication device of claim 8, wherein:

each sequence of amplitude bits of the set of sequences of amplitude bits is different than all of the other sequences of amplitude bits of the set of sequences of amplitude bits but has a same length as all of the other sequences of amplitude bits of the set of sequences of amplitude bits; and each symbol amplitude of the set of symbol amplitudes is different than all of the other symbol amplitudes of the set of symbol amplitudes.

10. The wireless communication device of claim 8, wherein the boundary is a boundary between adjacent data units of the plurality of data units, and wherein the code, when executed by the at least one processor in conjunction with the at least one modem, is further configured to:

determine whether the information bits for a current data unit are not enough in number to enable the performance of the prefix encoding operation to generate one or more sequences of amplitude bits for the current data unit;

add padding bits to the information bits in the current data unit; and further perform the prefix encoding operation on the padding bits, wherein a number of added padding bits is equal to the number of bits needed to complete the generation of the one or more sequences of amplitude bits, wherein the sequence of amplitude bits of the set of sequences of amplitude bits that is not associated with any one of the patterns of bit values of the set of patterns of bit values is inserted after the amplitude bits generated based on the padding bits and before any amplitude bits generated based on information bits of a next data unit.

11. The wireless communication device of claim 8, wherein the boundary is a boundary at the end of a group of multiple bytes of information bits of a plurality of groups of multiple bytes of information bits, and wherein the code, when executed by the at least one processor in conjunction with the at least one modem, is further configured to:

determine whether the information bits for a current group are not enough in number to enable the performance of the prefix encoding operation to generate one or more sequences of amplitude bits for the current group;

add padding bits to the information bits in the current group; and further perform the prefix encoding operation on the padding bits, wherein a number of added padding bits is equal to the number of bits needed to complete the generation of the one or more sequences of amplitude bits, wherein the sequence of amplitude bits of the set of sequences of amplitude bits that is not associated with any one of the patterns of bit values of the set of patterns of bit values is inserted after the amplitude bits generated based on the padding bits and before any amplitude bits generated based on information bits of a next data unit.

12. The wireless communication device of claim 11, wherein the group comprises multiple contiguous data units of the plurality of data units or multiple contiguous bytes of information bits within a single data unit of the plurality of data units.

13. The wireless communication device of claim 12, wherein a length of the group of multiple bytes of information bits is equal to an integer multiple of two-byte segments of the information bits or an integer multiple of four-byte segments of the information bits.

14. The wireless communication device of claim 8, wherein the boundary is a boundary at the end of a group of multiple information bits corresponding to an integer number of orthogonal frequency division multiplexing (OFDM) symbols.

* * * * *